ание

United States Patent
Shiozawa et al.

(10) Patent No.: US 11,358,477 B2
(45) Date of Patent: Jun. 14, 2022

(54) BRAKING/DRIVING FORCE CONTROL METHOD AND BRAKING/DRIVING FORCE CONTROL DEVICE

(71) Applicant: Nissan Motor Co., Ltd., Yokohama (JP)

(72) Inventors: Yuuki Shiozawa, Kanagawa (JP); Katsuaki Kubotera, Kanagawa (JP); Tatsuya Suzuki, Kanagawa (JP); Naoki Miyashita, Kanagawa (JP); Mitsunori Ohta, Kanagawa (JP); Tomoyuki Kashiwaya, Kanagawa (JP); Satoshi Ota, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 207 days.

(21) Appl. No.: 15/774,457

(22) PCT Filed: Nov. 9, 2015

(86) PCT No.: PCT/JP2015/005586
§ 371 (c)(1),
(2) Date: May 8, 2018

(87) PCT Pub. No.: WO2017/081714
PCT Pub. Date: May 18, 2017

(65) Prior Publication Data
US 2018/0326852 A1 Nov. 15, 2018

(51) Int. Cl.
*B60L 15/20* (2006.01)
*B60W 30/00* (2006.01)
(Continued)

(52) U.S. Cl.
CPC ............ *B60L 15/2018* (2013.01); *B60L 7/18* (2013.01); *B60L 9/18* (2013.01); *B60L 15/2009* (2013.01);
(Continued)

(58) Field of Classification Search
CPC .... B60W 30/00; B60W 30/18; B60W 30/188; B60W 30/18127; B60W 40/105;
(Continued)

(56) References Cited

U.S. PATENT DOCUMENTS 6,033,041 A * 3/2000 Koga ................... B60L 7/12
188/159
6,411,881 B1 * 6/2002 Thomas ................ B60T 7/122
180/69.6

(Continued)

FOREIGN PATENT DOCUMENTS

EP    3093185 A1    11/2016
JP    H10322807 A * 12/1998 .......... B60L 15/2018
(Continued)

*Primary Examiner* — Dale W Hilgendorf
(74) *Attorney, Agent, or Firm* — Young Basile Hanlon & MacFarlane, P.C.

(57) ABSTRACT

A magnitude of a road surface slope along which a vehicle travels is detected, when the magnitude of the road surface slope increases, a basic braking force set in advance is corrected to be decreased based on the magnitude of the road surface slope, or a basic driving force set in advance is corrected to be increased based on the magnitude of the road surface slope, when the magnitude of the road surface slope decreases, a basic braking force is corrected to be increased based on the magnitude of the road surface slope or a basic driving force is corrected to be decreased based on the magnitude of the road surface slope, and the corrected braking force or driving force is generated.

29 Claims, 18 Drawing Sheets

(51) Int. Cl.
*B60W 40/076* (2012.01)
*B60W 40/105* (2012.01)
*B60L 7/18* (2006.01)
*B60W 30/18* (2012.01)
*B60W 30/188* (2012.01)
*B60L 9/18* (2006.01)

(52) U.S. Cl.
CPC ...... *B60W 30/00* (2013.01); *B60W 30/18127* (2013.01); *B60W 40/076* (2013.01); *B60W 40/105* (2013.01); *B60W 30/188* (2013.01); *B60W 2520/10* (2013.01); *B60W 2540/10* (2013.01); *B60W 2552/15* (2020.02)

(58) Field of Classification Search
CPC ......... B60W 40/076; B60W 2550/142; B60W 2540/10; B60W 2540/12; B60W 2520/10; B60L 15/2009; B60L 15/2018; B60L 9/18; B60L 7/18; Y02T 10/645; Y02T 10/7275; Y02T 10/72; B60Y 2300/18008; B60T 2270/608
See application file for complete search history.

(56) References Cited

U.S. PATENT DOCUMENTS

| | | | | |
|---|---|---|---|---|
| 8,160,797 B2* | 4/2012 | Amamiya | ....... | B60W 30/18063 180/116 |
| 8,340,860 B2* | 12/2012 | Kobayashi | ......... | B60W 40/107 701/30.5 |
| 9,150,216 B2* | 10/2015 | Tojo | ....................... | B60W 50/06 |
| 9,188,602 B2* | 11/2015 | Tohta | ....................... | G01P 21/00 |
| 9,461,578 B2* | 10/2016 | Katsumata | .............. | B60L 15/20 |
| 9,845,022 B2* | 12/2017 | Komatsu | ............... | B60L 15/2009 |
| 9,902,272 B2* | 2/2018 | Sawada | ..................... | B60L 7/14 |
| 9,919,617 B2* | 3/2018 | Sawada | ................... | B60L 15/20 |
| 9,963,141 B2* | 5/2018 | Yamamoto | ............... | B60K 6/48 |
| 10,220,848 B2* | 3/2019 | Ohta | ....................... | B60K 31/00 |
| 2003/0184155 A1* | 10/2003 | Crombez | .................. | B60L 7/26 303/152 |
| 2008/0228334 A1* | 9/2008 | Hashimoto | ............ | B60K 6/365 701/22 |
| 2009/0048755 A1* | 2/2009 | Tokimasa | ............... | B60K 31/00 701/70 |
| 2009/0145673 A1* | 6/2009 | Soliman | ................ | B60W 20/13 180/65.1 |
| 2012/0109439 A1* | 5/2012 | Akebono | ........ | B60W 30/18027 701/22 |
| 2013/0066493 A1* | 3/2013 | Martin | ............ | B60W 30/18136 180/65.265 |
| 2015/0375746 A1* | 12/2015 | Naito | ............... | B60W 30/18063 701/70 |
| 2016/0347202 A1 | 12/2016 | Sawada et al. | | |

FOREIGN PATENT DOCUMENTS

| | | | | |
|---|---|---|---|---|
| JP | 2000205015 A | 7/2000 | | |
| JP | 2002152903 A | 5/2002 | | |
| JP | 2011011648 A | 1/2011 | | |
| KR | 20120038506 A | * 4/2012 | ........ | B60W 2520/10 |
| WO | 2015105077 A1 | 7/2015 | | |

* cited by examiner

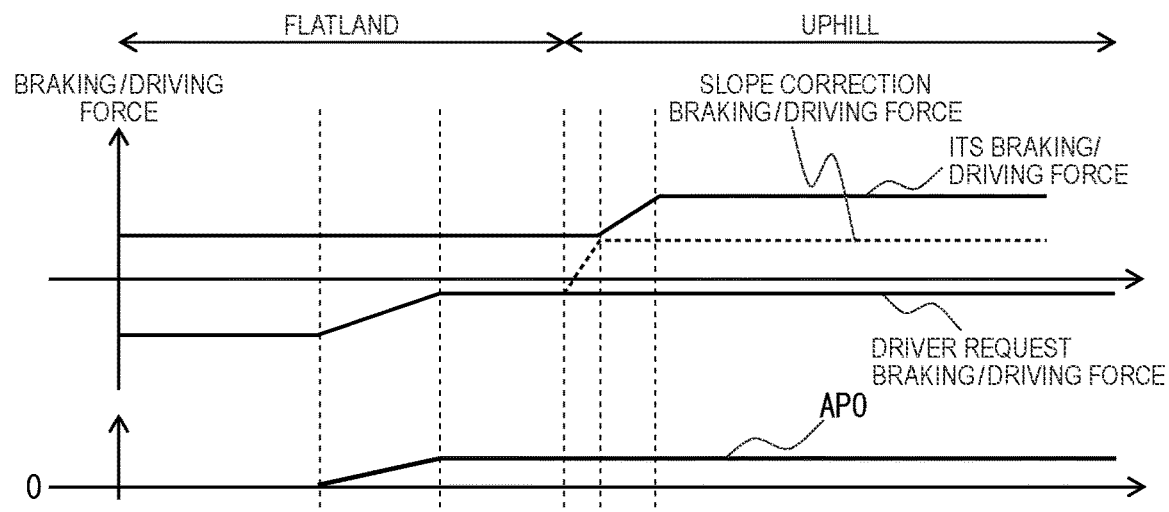
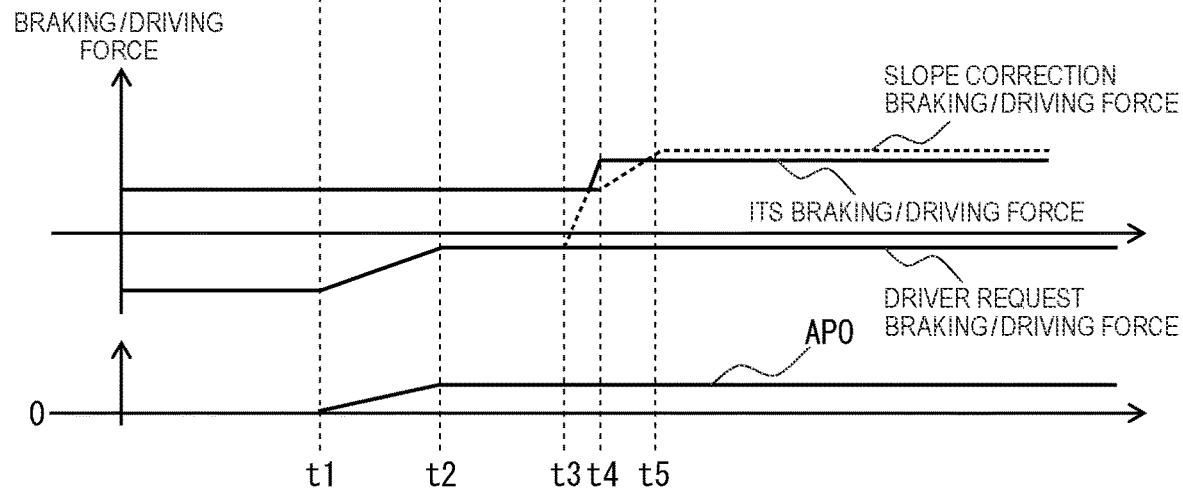

FIG. 17
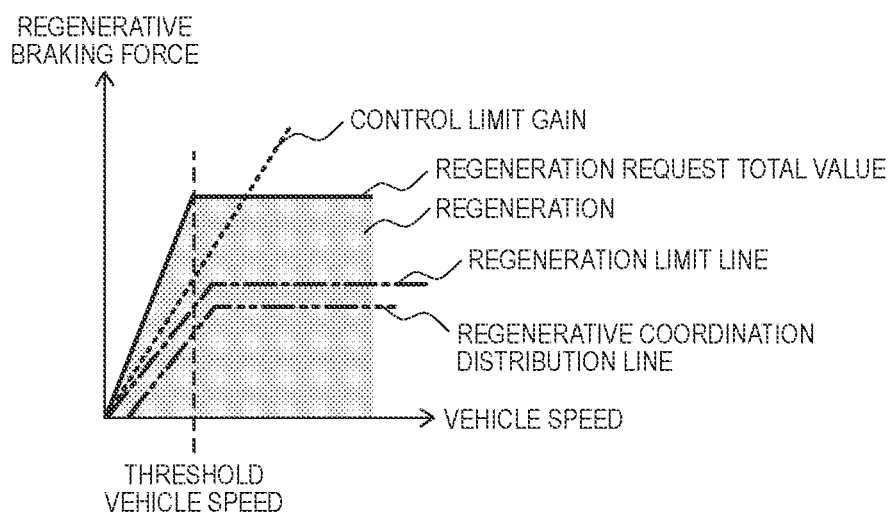
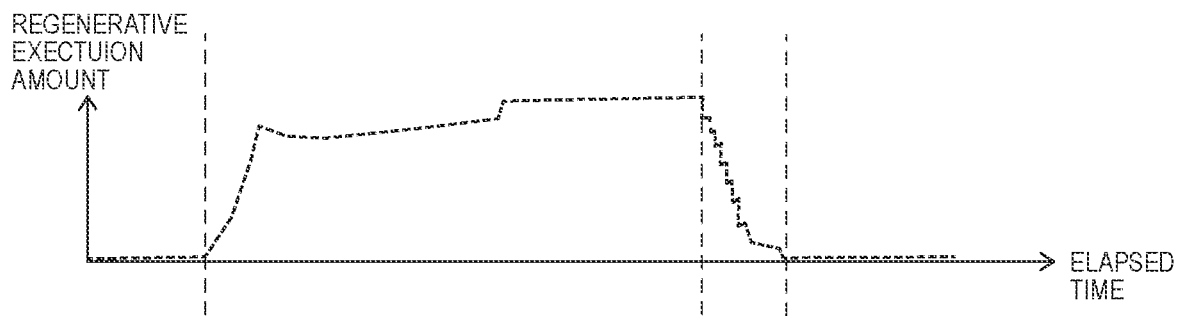
FIG. 18A
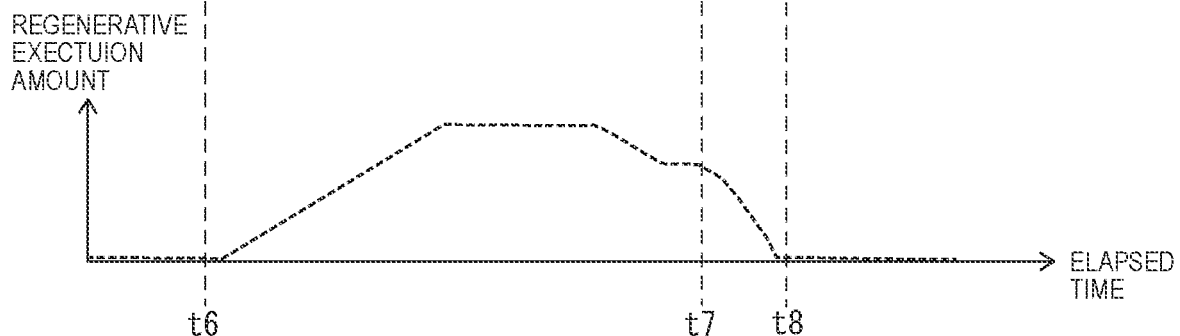
FIG. 18B

BRAKING/DRIVING FORCE CONTROL METHOD AND BRAKING/DRIVING FORCE CONTROL DEVICE

TECHNICAL FIELD

This invention relates to a braking/driving force control method and a braking/driving force control device.

BACKGROUND

Japanese Patent Application JP 2000-205015 A discloses, for example, a technology for controlling a braking/driving force of a vehicle. In the technology disclosed in Japanese Patent Application JP 2000-205015 A, when the operation amount of the accelerator pedal is equal to or larger than a predetermined amount, a target acceleration is set, and alternatively when the operation amount of the accelerator pedal is less than the predetermined amount, a target deceleration is set. The braking/driving force of the vehicle is controlled such that the set target acceleration or the target deceleration is realized.

However, the technology disclosed in the above described Japanese Patent Application JP 2000-205015 A has a problem that during the travelling in which the operation amount of the accelerator pedal is constant, the acceleration/deceleration and the vehicle speed may change depending on the change in the road surface slope along which the vehicle travels. Note that the change in the road surface slope includes, for example, a case where the traveling road surface is changed from a flatland to a sloping road and a case where during travelling on the sloping road, a slope of the sloping road changes.

SUMMARY

The present invention is made to solve the above described problem, and an object of the present invention is to provide a braking/driving force control method and a braking/driving force control device that can suppress the change in the acceleration/deceleration and the vehicle speed depending on the change in the road surface slope.

To solve the above described problems, according to one aspect of the present invention, when the magnitude of the road surface slope along which the vehicle travels increases, a basic braking force set in advance is corrected to be decreased based on the magnitude of the road surface slope, or a basic driving force set in advance is corrected to be increased based on the magnitude of the slope. The corrected braking force or the driving force is generated.

On the other hand, when the magnitude of the road surface slope decreases, the basic braking force is corrected to be increased based on the magnitude of the road surface slope or, the basic driving force is corrected to be decreased based on the magnitude of the road surface slope. Then, the corrected braking force or the driving force is generated.

BRIEF DESCRIPTION OF THE DRAWINGS

FIGS. 16A and 16B are time charts illustrating operations of a vehicle; FIG. 16A is a time chart illustrating operations of the vehicle including the braking/driving force control device according to the first embodiment of the present invention; and FIG. 16B is a time chart illustrating operations of the vehicle not including the braking/driving force control device according to the first embodiment of the present invention;

FIG. 17 is a drawing illustrating a braking force map with a configuration not applied with the braking/driving force control device according to the first embodiment of the present invention;

FIGS. 18A and 18B is a time chart illustrating operations of a vehicle; FIG. 18A is a time chart illustrating operations of the vehicle not including the braking/driving force control device according to the first embodiment of the present invention; and FIG. 18B is a time chart illustrating operations of the vehicle including the braking/driving force control device according to the first embodiment of the present invention;

DETAILED DESCRIPTION

Figure 1:
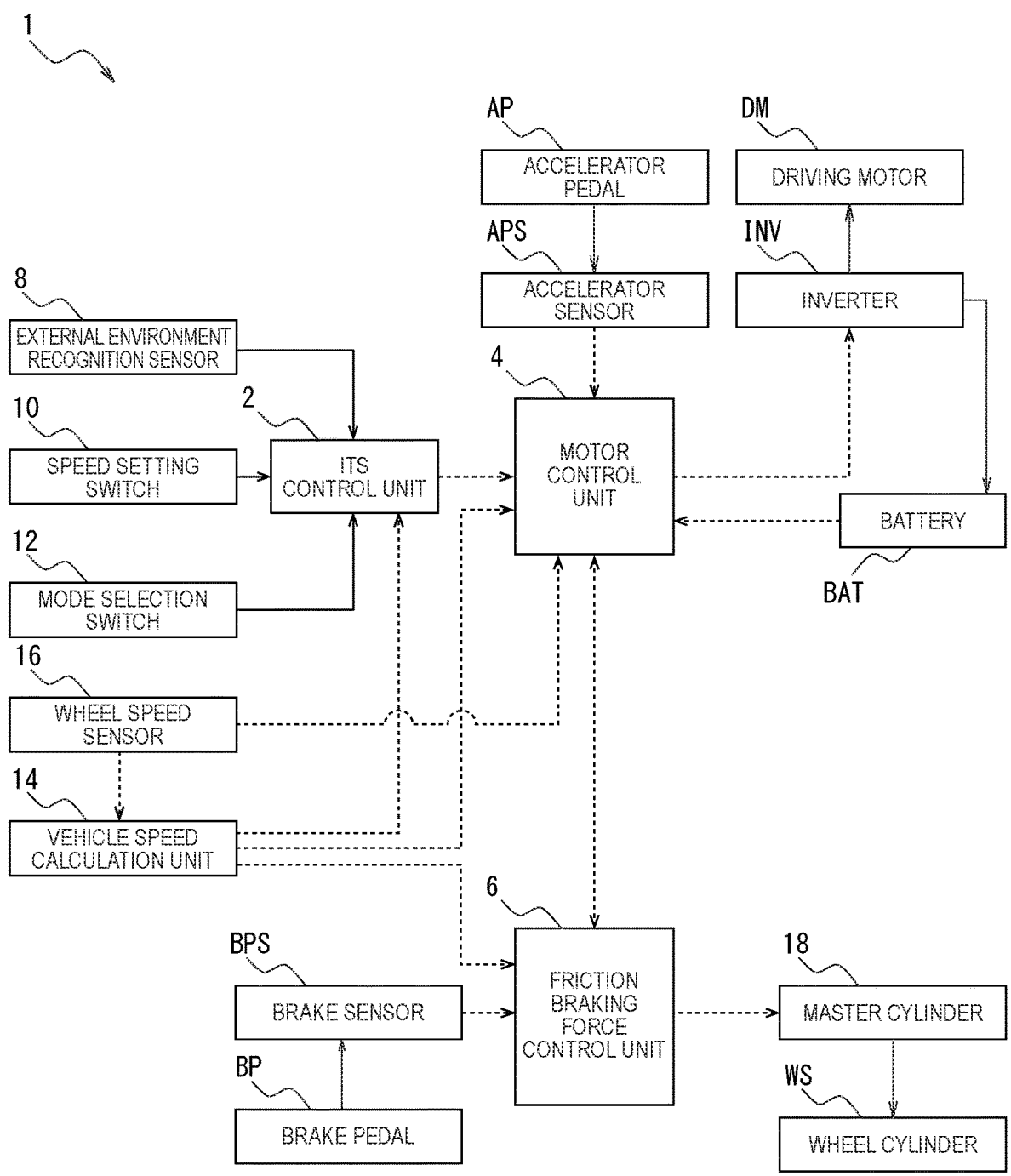
FIG. 1 is a block diagram illustrating a configuration of a braking/driving force control device according to the first embodiment of the present invention.

Specific details are described below to provide complete understanding of embodiments of the present invention. However, even if the specific details are not described, it is clear that one or more embodiments can be carried out.

Further, the well-known structures and devices may be represented schematically to simplify the drawing.

First Embodiment

The first embodiment of the present invention is described below with reference to drawings.

(Configuration of Braking/Driving Force Control Device)

With reference to FIG. 1 to FIG. 15, a configuration of a braking/driving force control device 1 according to the first embodiment is described.

As illustrated in FIG. 1, the braking/driving force control device 1 includes an ITS (Intelligent Transport System) control unit 2, a motor control unit 4, and a friction braking force control unit 6.

The ITS control unit 2 is configured from, for example, a microcomputer.

Note that the microcomputer includes, for example, Central Processing Unit (CPU), Random Access Memory (RAM), Read Only Memory (ROM) and the like.

The ITS control unit 2 receives information signals from an external environment recognition sensor 8, a speed setting switch 10, a mode selection switch 12, and a vehicle speed calculation unit 14.

The ITS control unit 2, using various received information signals, controls a braking force and a driving force generated to a vehicle including the braking/driving force control device 1. The braking force controlled by the ITS control unit 2 is the braking force that is controlled separately from a braking force request by a driver of a vehicle. Similarly, the driving force controlled by the ITS control unit 2 is the driving force that is controlled separately from the driving force request by a driver of the vehicle.

Note that detailed configurations of the ITS control unit 2 are described later.

The external environment recognition sensor 8 is formed from, for example, an image capturing device such as a wide-angle camera and a distance measuring device such as a laser range finder (LRF).

The external environment recognition sensor 8, using the image capturing device and the distance measuring device, detects a control object that is present at the circumference of the vehicle (especially, in front of vehicle). The external environment recognition sensor 8 that has detected the control object present at the circumference of the vehicle outputs the information signal including the detected control object (hereinafter, sometimes referred to as "control object signal") to the ITS control unit 2.

Note that, the control objects are, for example, other vehicles such as preceding vehicles, pedestrians, animals, guard rails, curbstones, and a lane marking.

The speed setting switch 10 is a switch for setting the travelling speed (control speed) of the vehicle when the automatic traveling control is conducted. Further, the speed setting switch 10 is formed from a switch (lever, button or the like) disposed at a position (such as steering wheel) where an occupant of the vehicle (driver or the like) can operate the switch.

The speed setting switch 10 outputs an information signal including the set travelling speed (set speed) (hereinafter sometimes referred to as "set speed signal") to the ITS control unit 2.

Note that the automatic traveling control includes an automatic speed control (control for travelling vehicle at a set travelling speed without pedaling accelerator pedal by driver) and controlling of a braking force or a driving force depending on the control object.

Although not especially illustrated, whether or not to conduct the automatic traveling control is selected by operating the switch disposed at a position (such as a steering wheel) where the occupant of the vehicle can operate the switch.

The mode selection switch 12 is a switch for selecting either one of a "one pedal mode" or a "two pedal mode" as a mode (control mode) for controlling the braking force and the driving force of the vehicle.

The "one pedal mode" is a control mode for controlling the braking force and the driving force of the vehicle C depending mainly on the operation of the accelerator pedal AP.

Hereinafter, control details of the braking force and the driving force depending on the operation amount of the accelerator pedal AP in the "one pedal mode" are specifically described. In the following descriptions, it is assumed that the vehicle travels on a flat road surface.

When the Accelerator Pedal AP is not Operated

When the accelerator pedal AP is not operated (including a case where accelerator pedal is not pedaled beyond free movement), the braking force depending on the holding stop-state necessary braking torque is generated.

The holding stop-state necessary braking torque is a braking torque for holding the stopped state of the vehicle and is set based on, for example, a weight of the vehicle, a capability of generating a regenerative braking force, and a capability of generating a friction braking force.

When the Operation Amount of the Accelerator Pedal AP is within a Braking Range

When the operation amount of the accelerator pedal AP is within the braking range, in response to the increase in the operation amount of the accelerator pedal AP, a braking force smaller than the braking force depending on the holding stop-state necessary braking torque is generated.

The braking range is a range corresponding to the operation amount of the accelerator pedal AP from an unoperated state to a braking/driving force switching operation amount.

The braking/driving force switching operation amount corresponds to, among the operation amounts (opening degree) of the accelerator pedal AP, the operation amount (opening degree) for switching between the driving force and the braking force generated to the vehicle. Note that the braking/driving force switching operation amount is set to the operation amount (opening degree) of the accelerator pedal AP of about 25%.

When the Operation Amount of the Accelerator Pedal AP is within a Driving Range.

When the operation amount of the accelerator pedal AP is within the driving range, the driving force is generated to be increased depending on the increased amount of the operation amount of the accelerator pedal AP over the braking/driving force switching operation amount.

The driving range is a range corresponding to the operation amount exceeding the braking/driving force switching operation amount of the accelerator pedal AP.

From the above, in the "one pedal mode", when the operation amount of the accelerator pedal AP is equal to or less than the braking/driving force switching operation amount, the driving force is not generated to the vehicle. Therefore, a creep phenomenon is not caused to the vehicle having the braking/driving force control device 1 according to the first embodiment. The creep phenomenon is a phenomenon caused to an automatic transmission (AT) vehicle that includes an internal-combustion engine as a drive source.

Note that although via the operation of the unillustrated switch or the like, a control for causing the creep phenomenon similar to that of the AT vehicle may be conducted, in the first embodiment, a control for not causing the creep phenomenon similar to that of the AT vehicle is described.

Therefore, when the operation amount of the accelerator pedal AP is less than a threshold value set in advance, the braking/driving force control device 1 according to the first embodiment generates the braking force depending on the operation amount of the accelerator pedal AP that is less than the threshold value and the travelling speed of the vehicle.

Further, when the operation amount of the accelerator pedal AP is equal to or larger than the threshold value, the braking/driving force control device 1 according to the first embodiment generates the driving force depending on the operation amount of the accelerator pedal AP that is equal to or larger than the threshold value and the travelling speed of the vehicle.

The "two pedal mode" is a control mode in which the braking force of the vehicle is controlled in accordance with the operation of mainly a brake pedal BP and the driving force of the vehicle is controlled in accordance with the operation of the accelerator pedal AP.

Specifically, in the "two pedal mode", when the accelerator pedal AP is operated (pedaled), the driving force is generated. Further, as the operation amount of the accelerator pedal AP increases, the driving force increases.

In the "two pedal mode", when the operation state of the accelerator pedal AP is shifted from an operated state to an unoperated state, a braking force corresponding to the engine brake is caused, which braking force is generally caused to a vehicle having an internal-combustion engine as a drive source. Via operations of unillustrated switches or the like, a control for not causing the braking force corresponding to the engine brake may be conducted.

The mode selection switch 12 is formed from a switch (dial or the like) disposed at a position (such as a dash board) where the occupant of the vehicle can operate the switch.

The mode selection switch 12 outputs an information signal including a selection result of a control mode (hereinafter sometimes referred to as "select mode signal") to the ITS control unit 2 and the motor control unit 4.

The vehicle speed calculation unit 14 receives, from a wheel speed sensor 16, a wheel speed signal including a revolution speed of a wheel. The vehicle speed calculation unit 14, using the revolution speed included in the wheel speed signal, calculates the travelling speed of the vehicle C (hereinafter sometimes referred to as "vehicle speed"). Additionally, the vehicle speed calculation unit 14 outputs an information signal including the calculated vehicle speed (hereinafter sometimes referred to as "vehicle speed signal") to the ITS control unit 2, the motor control unit 4, and the friction braking force control unit 6.

Note that the vehicle speed calculation unit 14 may be included in, for example, a known Vehicle Dynamics Control (VDC) system.

Figure 2:
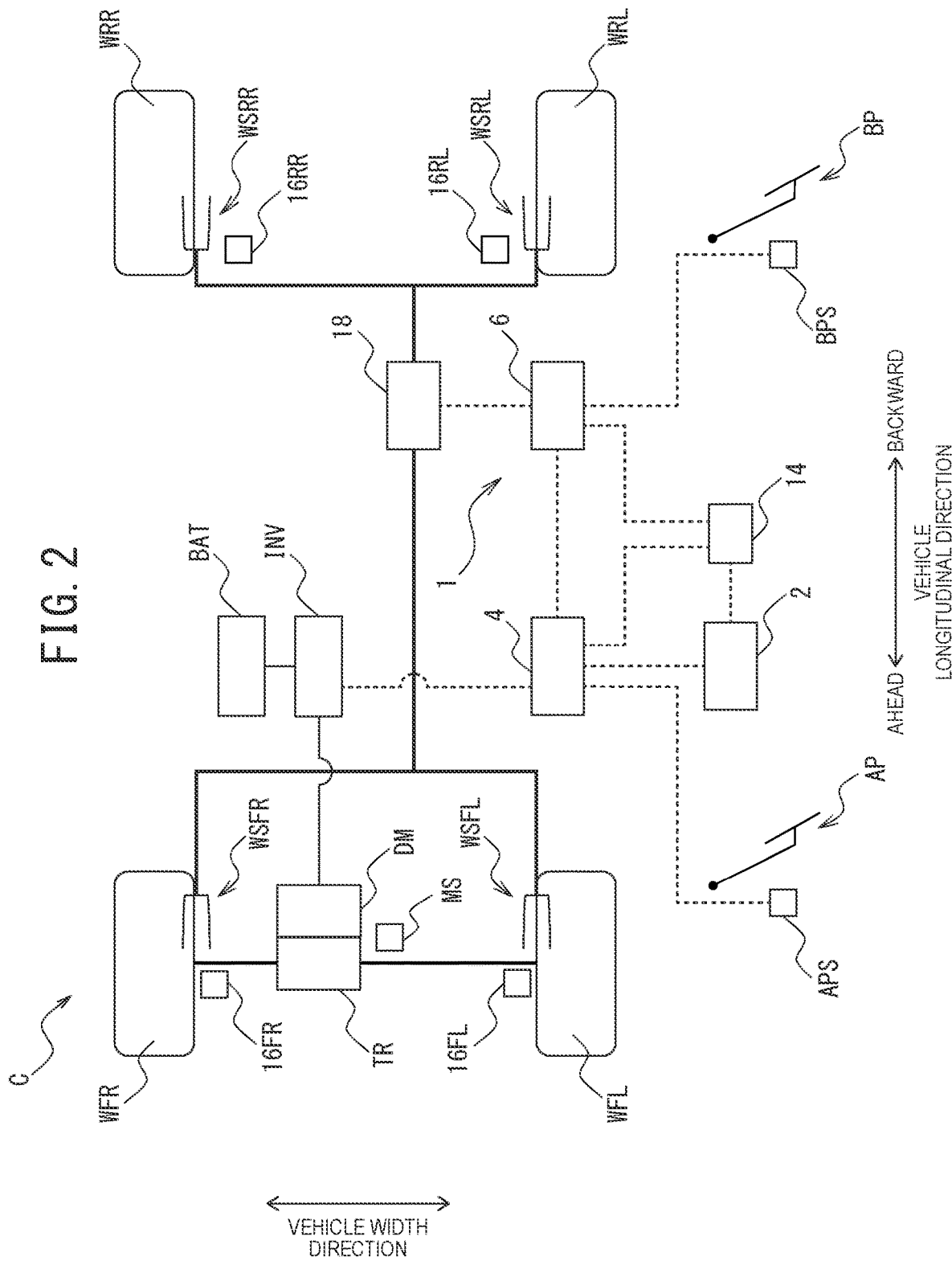
FIG. 2 is a block diagram illustrating a configuration of a vehicle including the braking/driving force control device according to the first embodiment of the present invention.

The wheel speed sensor 16 is, as illustrated in FIG. 2, mounted to the vehicle C. The wheel speed sensor 16 generates the predetermined number of wheel speed pulses for one rotation of the wheel W of the vehicle C.

Further, the wheel speed sensor 16 outputs the wheel speed signal including the revolution speed of the wheel to the motor control unit 4. The motor control unit 4 controls the regenerative braking force and the driving force generated to the vehicle C. Further, the motor control unit 4, similarly to the ITS control unit 2, is configured from, for example, a microcomputer.

Note that detailed configurations of the motor control unit 4 are described later.

The friction braking force control unit 6 controls a friction braking force generated to the vehicle C. The friction braking force control unit 6, similarly to the motor control unit 4, is configured from, for example, a microcomputer.

Note that detailed configurations of the friction braking force control unit 6 are described later.

(Detailed Configurations of ITS Control Unit 2)

Figure 3:
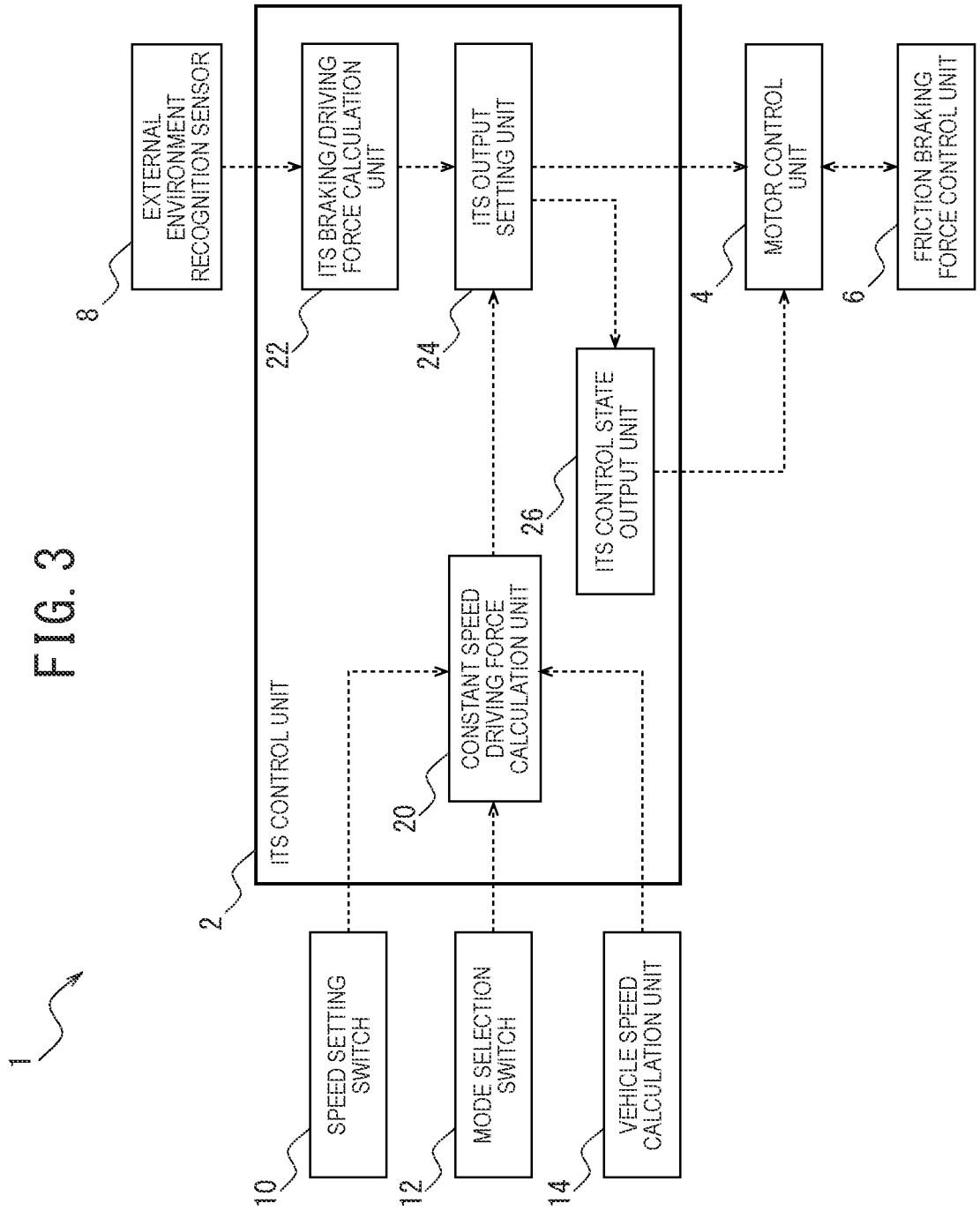
FIG. 3 is a block diagram illustrating a configuration of an ITS control unit.

The ITS control unit 2, as illustrated in FIG. 3, includes a constant speed driving force calculation unit 20, an ITS braking/driving force calculation unit 22, an ITS output setting unit 24, and an ITS control state output unit 26.

The constant speed driving force calculation unit 20 receives a set speed signal, a select mode signal, and a vehicle speed signal. The constant speed driving force calculation unit 20 calculates the driving force generated to the vehicle based on the control mode included in the select mode signal, and a deviation (speed difference) between the set speed included in the set speed signal and the vehicle speed included in the vehicle speed signal.

The constant speed driving force calculation unit 20, for example, increases the driving force when the vehicle speed is less than the set speed, and decreases the driving force when the vehicle speed exceeds the set speed.

The constant speed driving force calculation unit 20 that has calculated the driving force to be generated to the vehicle outputs an information signal including the calculated driving force (hereinafter sometimes referred to as "constant speed driving force signal") to the ITS output setting unit 24.

The ITS braking/driving force calculation unit 22 receives a control object signal. The ITS braking/driving force calculation unit 22 calculates the braking force or the driving force generated to the vehicle depending on the control object included in the control object signal.

The ITS braking/driving force calculation unit 22 increases the braking force, for example, when the control object is present in the travelling direction of the vehicle and as the distance between the control object and the vehicle is short. Further, the ITS braking/driving force calculation unit 22 increases the driving force, when, for example, the control object is present in the travelling direction of the vehicle and the distance between the control object and the vehicle is short.

The ITS braking/driving force calculation unit 22 that has calculated the braking force or the driving force generated to the vehicle outputs an information signal including the calculated braking force or the driving force (hereinafter sometimes referred to as "ITS braking/driving force signal") to the ITS output setting unit 24.

The ITS output setting unit 24 receives a constant speed driving force signal and an ITS braking/driving force signal. Then, the ITS output setting unit 24 selects either one of the driving force included in the constant speed driving force signal and the braking force or the driving force included in the ITS braking/driving force signal. The ITS output setting unit 24 outputs an information signal including the selected braking force or the driving force (hereinafter sometimes referred to as "ITS output signal") to the ITS control state output unit 26 and a motor control unit 4.

The ITS control state output unit 26 receives the ITS output signal. The ITS control state output unit 26 determines whether or not the constant speed driving force calculation unit 20 and the ITS braking/driving force calculation unit 22 calculate the braking force or the driving force depending on the automatic speed control or the control object, based on the braking force or the driving force included in the ITS output signal. The ITS control state output unit 26 outputs an information signal including the determination result (hereinafter sometimes referred to as "ITS determination signal") to the motor control unit 4.

(Detailed Configurations of Motor Control Unit 4)

Figure 4:
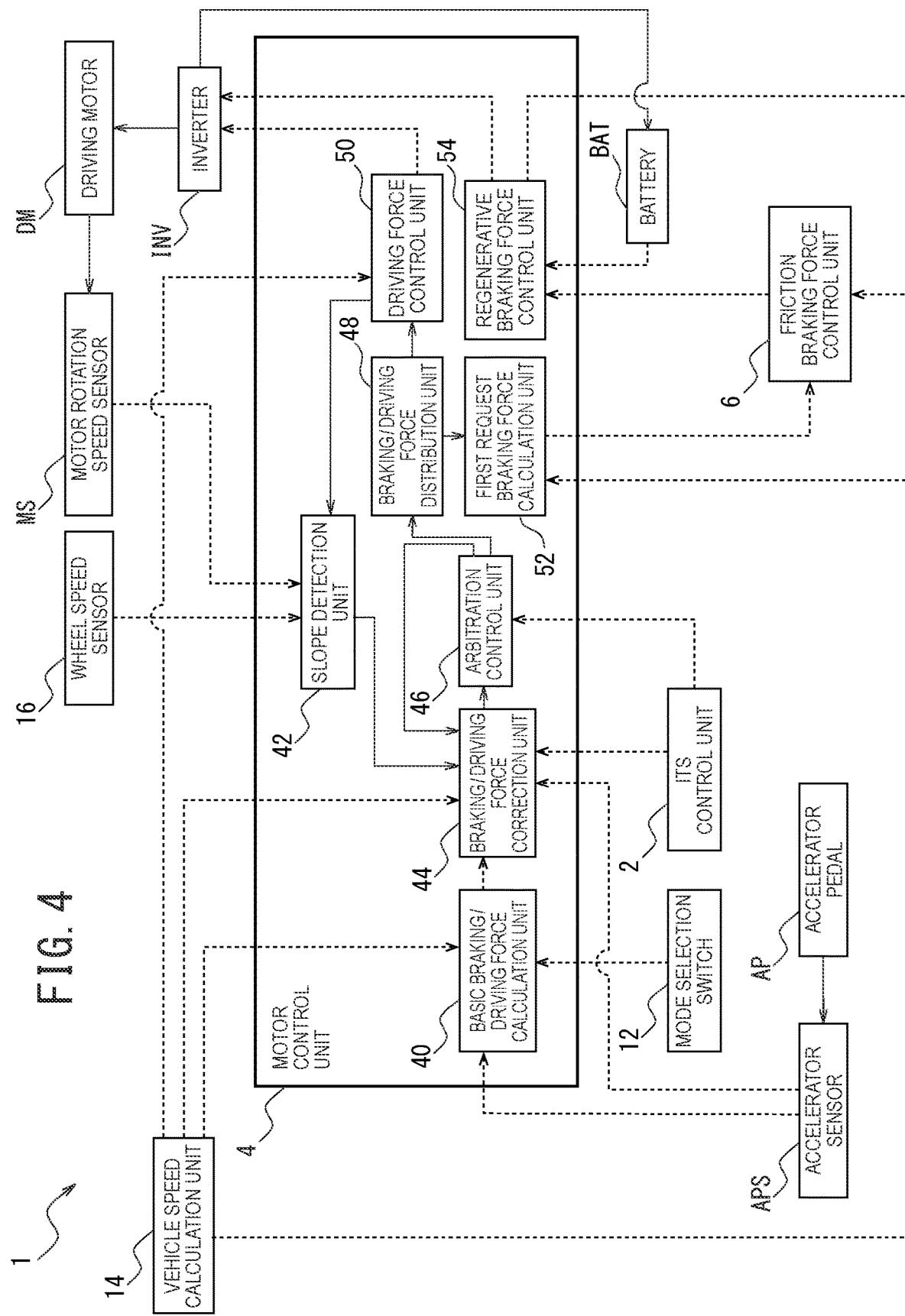
FIG. 4 is a block diagram illustrating a configuration of a motor control unit.

The motor control unit 4, as illustrated in FIG. 4, includes a basic braking/driving force calculation unit 40, a slope detection unit 42, and a braking/driving force correction unit 44. Additionally, the motor control unit 4 includes an arbitration control unit 46, a braking/driving force distribution unit 48, a driving force control unit 50, a first request braking force calculation unit 52, and a regenerative braking force control unit 54.

The basic braking/driving force calculation unit 40 stores in advance a braking/driving force map.

Figure 5:
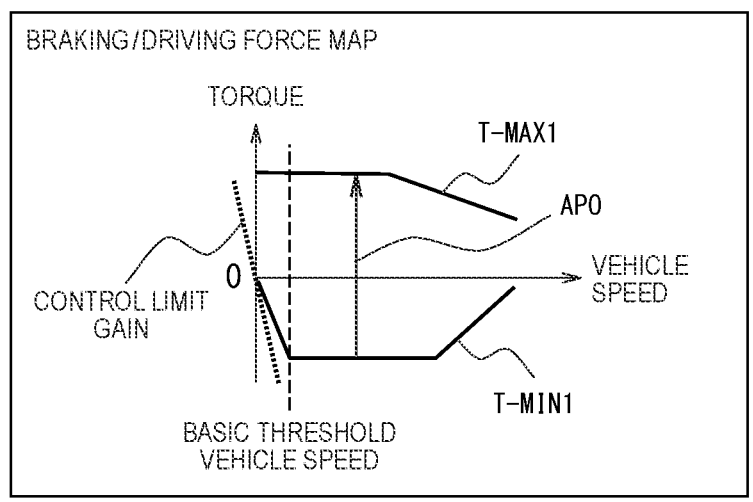
FIG. 5 is a drawing illustrating a braking/driving force map.

The braking/driving force map is a map, for example, as illustrated in FIG. 5, indicating a relationship among the vehicle speed, the operation amount (opening degree) of the accelerator pedal AP, and the torque (driving torque, braking torque) generated to the vehicle.

The braking/driving force map illustrated in FIG. 5 is set in advance such that the driving torque and the braking torque have braking/driving force values set in advance when the following conditions A1 to A3 are established.
A1. The road surface slope (slope of traveling road surface) is within a slope range set in advance including zero.
A2. The operation amount of the accelerator pedal AP is equal to or less than a stop threshold operation amount.
A3. The vehicle speed is equal to or less than the stop threshold vehicle speed set in advance.

In the first embodiment, as one example, a slope range is set to be a slope range when the traveling road surface is flat (for example, with the slope "0" as a reference, a range from +0.5° to −0.5°). Further, in the first embodiment, as one example, a case where the braking/driving force value is set to "0" is described.

In the first embodiment, as one example, a case where the stop threshold operation amount is set to "0" is described. Further, in the first embodiment, as one example, a case where the stop threshold vehicle speed is set to "0" is described.

Accordingly, in the first embodiment, the braking/driving force map illustrated in FIG. 5 is set in advance such that when the traveling road surface is flat and the operation amount of the accelerator pedal AP and the vehicle speed are "0", the driving torque and the braking torque is "0".

Note that in FIG. 5, the operation amount (opening degree) of the accelerator pedal AP is denoted with a reference numeral "APO". Further, in FIG. 5, in a state where the operation amount of the accelerator pedal AP is a minimum value (unoperated), the torque generated depending on the vehicle speed is denoted with a reference numeral "T-MIN1". Further, in FIG. 5, in a state where the operation amount of the accelerator pedal AP is a maximum value (pedaling operation amount is maximum), the torque generated depending on the vehicle speed is denoted with the reference numeral "T-MAX1".

In FIG. 5, the driving torque and the braking torque are represented on a longitudinal axis with "0" as the border line. Thus, in the braking/driving force map illustrated in FIG. 5, the torque denoted with "T-MIN1" is only the braking torque. Further, in the braking/driving force map illustrated in FIG. 5, the torque denoted with the "T-MAX1" is only the driving torque.

The "basic threshold vehicle speed" illustrated in FIG. 5, in a state where the operation amount of the accelerator pedal AP is a minimum value (unoperated), corresponds to the border line between an area (change area) in which the change in the torque generated depending on the vehicle speed decreases and an area (fixed area) in which the change in the torque generated depending on the vehicle speed is constant.

The accelerator pedal AP is a pedal provided to the vehicle and is a pedal operated by the driver of the vehicle in response to the braking force request or the driving force request.

The basic braking/driving force calculation unit 40 receives, from the accelerator sensor APS, an information signal including the operation amount of the accelerator pedal AP (braking/driving force operation amount). Additionally, the basic braking/driving force calculation unit 40 receives, from the vehicle speed calculation unit 14, the vehicle speed signal.

Further, the basic braking/driving force calculation unit 40 receives, from the mode selection switch 12, the select mode signal. Note that a case where a control mode included in the select mode signal is the "one pedal mode" is described below.

The basic braking/driving force calculation unit 40 inputs the operation amount of the accelerator pedal AP and the vehicle speed to the braking/driving force map to calculate a target value of the driving torque generated to the vehicle C (target driving torque) or a target value of the braking torque (target braking torque). Note that the target driving torque and the target braking torque calculated by the basic braking/driving force calculation unit 40 are the target driving torque and the target braking torque when the vehicle C travels on the flat road surface (flat traveling). The target driving torque is a torque corresponding to the basic driving force and the target braking torque is a torque corresponding to the basic braking force.

In other words, the basic braking/driving force calculation unit 40 inputs the operation amount of the accelerator pedal AP and the vehicle speed to the braking/driving force map to set the basic braking force and the basic driving force.

Accordingly, the braking/driving force map illustrated in FIG. 5 includes a change area in which as the vehicle speed decreases (approach zero), the basic braking force decreases. In other words, the braking/driving force map illustrated in FIG. 5 is set in advance such that when the traveling road surface is flat, and if the operation amount of the accelerator pedal AP is zero and the travelling speed is zero, the basic braking force and the basic driving force are zero.

According to the braking/driving force map illustrated in FIG. 5, when the operation amount of the accelerator pedal AP is equal to or less than the stop threshold operation amount (zero in first embodiment), the braking force for stopping the vehicle C is generated.

In other words, the basic braking/driving force calculation unit 40, depending on the operation amount of the accelerator pedal AP and the vehicle speed, calculates the basic braking force and the basic driving force.

Specifically, when the operation amount of the accelerator pedal AP is less than a threshold value set in advance (braking/driving force switching operation amount), the basic braking force depending on the operation amount of the accelerator pedal AP that is less than the threshold value and the travelling speed when the traveling road surface is flat is calculated. On the other hand, when the operation amount of the accelerator pedal AP is equal to or larger than the threshold value, the basic driving force depending on the operation amount of the accelerator pedal AP that is equal to or larger than the threshold value and the travelling speed when the traveling road surface is flat is calculated.

Accordingly, the basic braking/driving force calculation unit 40 inputs, to the braking/driving force map, the operation amount of the accelerator pedal AP and the vehicle speed to calculate the basic braking force and the basic driving force.

Further, the basic braking/driving force calculation unit 40, when the road surface slope is within the slope range (traveling road surface is flat), sets the braking force generated to the vehicle C to the basic braking force set in advance or sets the driving force generated to the vehicle C to the basic driving force set in advance.

The basic braking/driving force calculation unit 40 that has calculated the target driving torque outputs an information signal including the calculated target driving torque (hereinafter sometimes referred to as "basic drive torque signal") to the braking/driving force correction unit 44.

The basic braking/driving force calculation unit 40 that has calculated the target braking torque outputs an information signal including the calculated target braking torque (hereinafter sometimes referred to as "basic braking torque signal") to the braking/driving force correction unit 44.

A "control limit gain" represented in the braking/driving force map is described in details.

Figure 10:
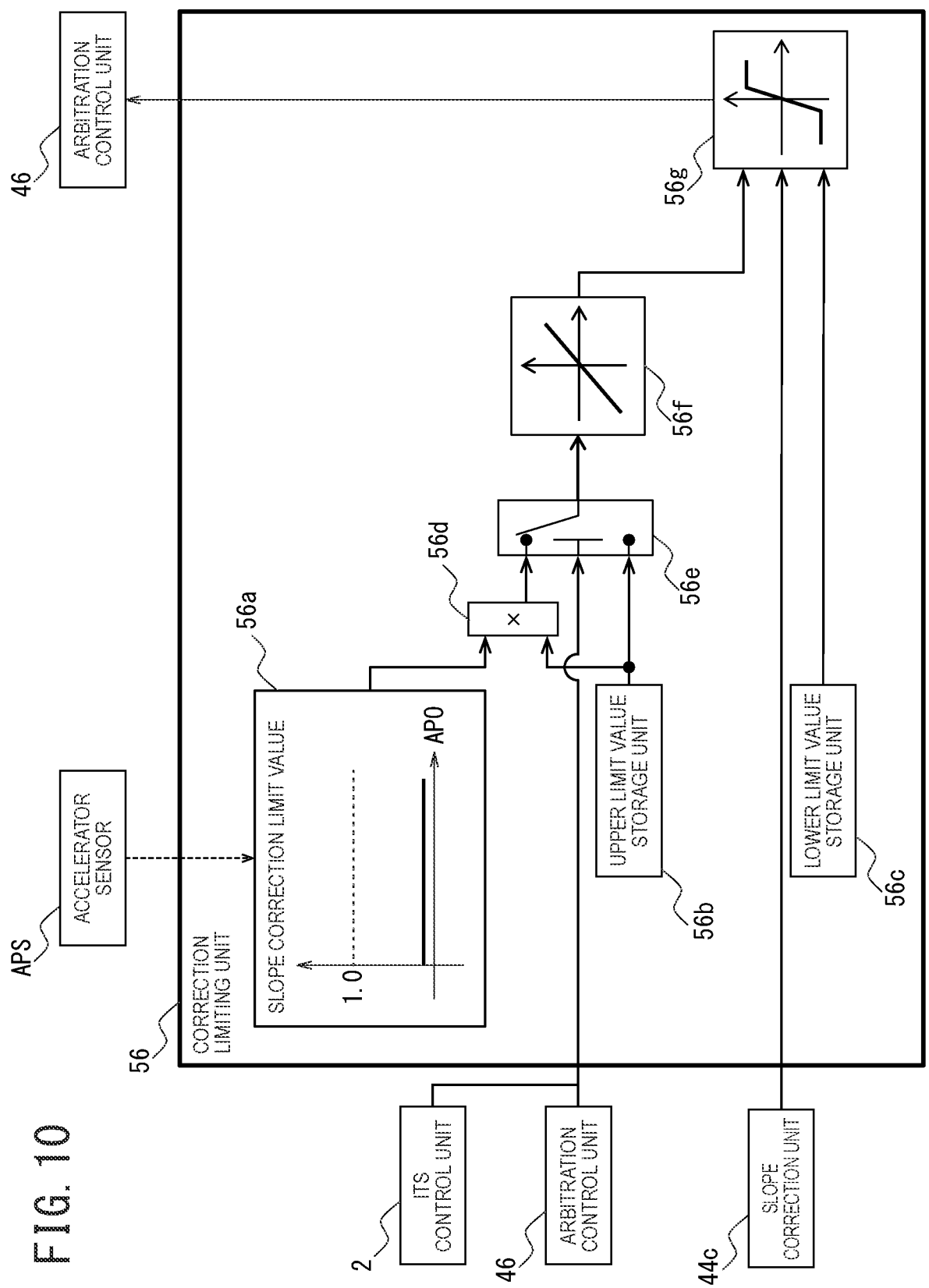
FIG. 10 is a block diagram illustrating a configuration of a correction limiting unit.

When the braking/driving force control device 1 is a system including an element of a response lag, in FIG. 10, if a slope of the line represented by "control limit gain" is increased too much (increase inclination angle too much), the hunting may be caused to the current command value of the driving motor DM (motor). This is because as the inclination angle of the line represented by control limit gain relative to the longitudinal axis representing the torque increases, the degree of change of the deceleration relative to the change in the vehicle speed increases.

Note that the "response lag" means that by the increase of the degree of change of the deceleration relative to the change in the vehicle speed, the change in the vehicle speed may not follow the sharp change in the deceleration depending on the regenerative braking force and the change in the vehicle speed is delayed relative to the change in the deceleration depending on the regenerative braking force.

When the hunting is caused to the current command value, the variation of the braking force that is different from the driver's request is generated to the decelerating vehicle C and the variation of the vehicle speed that is different from the driver's request is generated.

The hunting caused to the current command value is generated based on following elements (1. to 6.) for example, in a state where the vehicle C is decelerated while travelling the road surface having a descending slope when the deceleration depending on the regenerative braking force is determined using the braking/driving force map.
1. Since the traveling road surface has the descending slope, the vehicle speed increases.
2. As the vehicle speed increases, the deceleration depending on the regenerative braking force increases.
3. Since the deceleration depending on the regenerative braking force increases, the vehicle speed decreases.
4. Since the vehicle speed decreases, the deceleration depending on the regenerative braking force decreases.
5. Since the deceleration depending on the regenerative braking force decreases, the vehicle speed decreases.
6. By repeating the above elements 2 to 5, the hunting is caused to the current command value.

If the slope of the line represented by the control limit gain is gentle (if inclination angle is small), relative to the change in the vehicle speed, the deceleration depending on the regenerative braking force does not sharply increase or decrease. Thus, relative to the change in the deceleration depending on the regenerative braking force, the occurrence of the phase lag of the change in the vehicle speed is suppressed and it is possible to suppress the hunting caused to the current command value. In other words, by making small the inclination angle of the line represented by control limit gain, it is possible to stabilize the control of the current command value.

From the above, the border line between a state where the control of the current command value is stable and a state where the control of the current command value is unstable corresponds to the line represented by the control limit gain in FIG. 5. In other words, the line represented by control limit gain in FIG. 5 is an upper limit of the degree of change of the regenerative braking force depending on the vehicle speed of the vehicle C. The inclination angle of the line represented by control limit gain in FIG. 5 is set based on, for example, the performance of the driving motor DM (capability to generate regenerative braking force), the weight of the vehicle C and the like. In other words, the control limit gain illustrated in FIG. 5 is the upper limit of the degree of change of the deceleration depending on the regenerative braking force (basic braking force) relative to the vehicle speed in which the change in the vehicle speed calculated by the vehicle speed calculation unit 14 can follow the change in the deceleration depending on the regenerative braking force (basic braking force).

In the region not greater than the basic threshold vehicle speed of the braking/driving force map, the degree of change of the torque denoted with "T-MIN1" relative to the change in the vehicle speed calculated by the vehicle speed calculation unit 14 is equal to or less than the control limit gain. In other words, in the region not greater than the basic threshold vehicle speed in the braking/driving force map, the degree of change of the minimum value of the torque relative to the change in the vehicle speed calculated by the vehicle speed calculation unit 14 is equal to or less than the control limit gain.

Further, in the braking/driving force map illustrated in FIG. 5, the degree of change of the basic braking force based on the change in the vehicle speed in the change area is equal to or less than the control limit gain that is the degree of change set in advance.

The slope detection unit 42 stores in advance a relationship between the driving torque generated for the flatland (flat road) and the revolution speed of the wheel as a reference (flatland reference). Note that a relationship between the driving torque generated for the flat road and the revolution speed of the wheel is calculated, for example, using the test road surface formed to the slope within the range corresponding to the flat road, and the slope detection unit 42 stores the relationship as the flatland reference.

The slope detection unit 42 receives, from the driving force control unit 50, the driving torque signal including the driving current command value and receives, from a wheel speed sensor 16, the wheel speed signal including the revolution speed of the wheel. Further, the slope detection unit 42, receives, from a motor rotation speed sensor MS, an output shaft rotation speed signal including the rotation speed of the motor driving force output shaft (not illustrated) of the driving motor DM.

The motor rotation speed sensor MS is formed from, for example, a resolver that detects the rotation speed (rotation state) of the motor driving force output shaft of the driving motor DM.

Note that descriptions of the driving torque signal and the output shaft rotation speed signal are made later.

The slope detection unit 42 calculates a relationship between the current driving torque that is calculated using the current command value and the revolution speed of the wheel W (current relationship). Further, the slope detection unit 42 detects the magnitude of the road surface slope using the degree of deviation between the calculated current relationship and the stored flatland reference.

For example, when the revolution speed of the wheel W relative to the driving torque is later than the flatland reference, the road surface slope is determined to be an upward slope. Additionally, as the revolution speed of the wheel W is delayed, the upward slope is detected as a large slope.

On the other hand, when the revolution speed of the wheel W relative to the driving torque is faster than the flatland reference, the road surface slope is determined to be the descending slope. Additionally, as the revolution speed of the wheel W is fast, the descending slop is detected as the large descending slop.

Accordingly, the slope detection unit 42 detects a direction of road surface slope along which the vehicle C travels and the magnitude of the road surface slope.

In other words, the slope detection unit 42 determines whether or not the direction of the road surface slope along which the vehicle C travels is an upstream direction or a downward direction.

The slope detection unit 42 that has detected the direction and the magnitude of the road surface slope outputs an information signal including the direction and the magnitude of the detected slope (hereinafter sometimes referred to as "road surface slope signal") to the braking/driving force correction unit 44 and the first request braking force calculation unit 52.

The braking/driving force correction unit 44 receives information signals from the accelerator sensor APS, the basic braking/driving force calculation unit 40, the slope detection unit 42, the vehicle speed calculation unit 14, the ITS control unit 2, and the arbitration control unit 46.

The braking/driving force correction unit 44 corrects the target driving torque of the flat traveling included in the basic drive torque signal and the target braking torque of the flat traveling included in the basic braking torque signal using the various received information signals.

The braking/driving force correction unit 44 that has corrected the target driving torque of the flat traveling included in the basic drive torque signal outputs an information signal including the driving force (corrected driving force) depending on the corrected driving torque (hereinafter sometimes referred to as "corrected driving force signal") to the arbitration control unit 46.

The braking/driving force correction unit 44 that has corrected the target braking torque of the flat traveling included in the basic drive torque signal outputs an information signal including the braking force depending on the corrected braking torque (corrected braking force) (hereinafter sometimes referred to as "corrected braking force signal") to the arbitration control unit 46.

In other words, when the traveling road surface is not flat, the braking/driving force correction unit 44 corrects the basic braking force based on the direction and the magnitude of the slope to calculate the corrected braking force, and sets the braking force of the vehicle C to the corrected braking force. Further, when the traveling road surface is not flat the braking/driving force correction unit 44 corrects the basic driving force based on the direction and the magnitude of the slope to calculate the corrected driving force, and sets the driving force of the vehicle C to the corrected driving force.

Note that detailed configurations of the braking/driving force correction unit 44 are described later.

The arbitration control unit 46 receives the corrected driving force signal or the corrected braking force signal, and an ITS output signal.

The arbitration control unit 46 determines whether or not a driver override is established based on the driving force or the braking force that is included in the ITS output signal and is selected by the ITS output setting unit 24, the driving force included in the corrected driving force signal, and the braking force included in the corrected braking force signal. The arbitration control unit 46 that has determined whether or not the driver override is established outputs an information signal including the determination result (hereinafter sometimes referred to as "Dr override determination signal") to the braking/driving force correction unit 44. Hereafter, "Dr" is to reference the vehicle driver.

The driver override indicates a state where the driver of the vehicle C has a control right of the driving force or the braking force of the vehicle C. In other words, the driver override indicates a state where, for example, the driving force intended by the driver of the vehicle C (driving force depending on the operation amount of the accelerator pedal AP) is larger than the driving force selected by the ITS output setting unit 24. Accordingly, when the driver override is established, the control of the braking/driving force by the ITS control unit 2 is stopped.

The determination as to whether or not the driver override is established is made by comparing a parameter selected by the ITS output setting unit 24 with a parameter included in the corrected driving force signal. In other words, when the driving force included in the corrected driving force signal exceeds the driving force selected by the ITS output setting unit 24, it is determined that the driver override is established. Further, when the braking force included in the corrected braking force signal exceeds the braking force selected by the ITS output setting unit 24, it is determined that the driver override is established.

The arbitration control unit 46 compares the parameter selected by the ITS output setting unit 24 with the parameter included in the corrected driving force signal and selects the driving force or the braking force to be output to the braking/driving force distribution unit 48.

Specifically, when the arbitration control unit 46 receives, from the ITS output setting unit 24, the ITS output signal including the driving force and receives, from the braking/driving force correction unit 44, the corrected driving force signal, the arbitration control unit 46 compares the driving force included in the corrected driving force signal with the driving force selected by the ITS output setting unit 24. Then, the arbitration control unit 46 selects a larger driving force (select-high) and outputs an information signal including the selected driving force (hereinafter sometimes referred to as "arbitration driving force signal") to the braking/driving force distribution unit 48.

On the other hand, when the arbitration control unit 46 receives, from the ITS output setting unit 24, the ITS output signal including the braking force and receives, from the braking/driving force correction unit 44, the corrected braking force signal, the arbitration control unit 46 compares the braking force included in the corrected braking force signal with the braking force selected by the ITS output setting unit 24. The arbitration control unit 46 selects a larger braking force (select-high) and outputs an information signal including the selected braking force (hereinafter sometimes referred to as "arbitration braking force signal") to the braking/driving force distribution unit 48.

After receiving the arbitration driving force signal from the arbitration control unit 46, the braking/driving force distribution unit 48 outputs an information signal similar to the arbitration driving force signal to the driving force control unit 50 as the driving force distribution signal.

After receiving the arbitration braking force signal from the arbitration control unit 46, the braking/driving force distribution unit 48 outputs an information signal similar to the arbitration braking force signal to the first request braking force calculation unit 52 as the braking force distribution signal.

The driving force control unit 50 receives information signals from the braking/driving force distribution unit 48 and the vehicle speed calculation unit 14. The driving force control unit 50 refers to the driving force included in the driving force distribution signal and the vehicle speed included in the vehicle speed signal and calculates the driving current command value.

The driving current command value is a current command value for generating the driving torque by the driving motor DM depending on the driving force included in the driving force distribution signal.

The driving force control unit 50 outputs an information signal including the calculated driving current command value (hereinafter sometimes referred to as "driving torque signal") to the slope detection unit 42 and an inverter INV.

Figure 6:
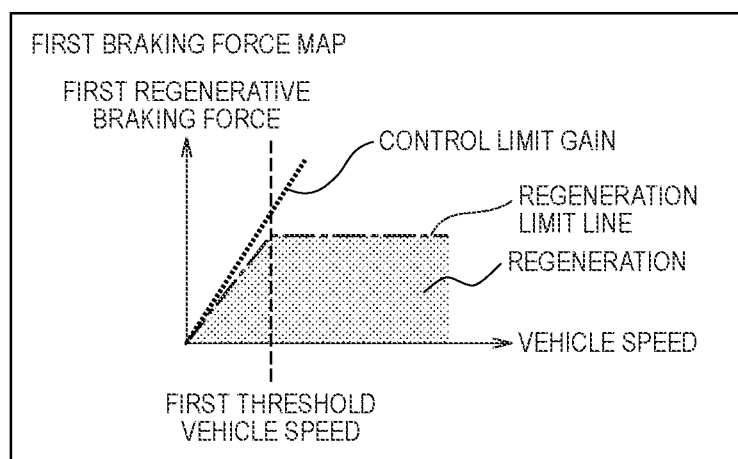
FIG. 6 is a drawing illustrating a first braking force map.

The first request braking force calculation unit 52 stores in advance the first braking force map illustrated in FIG. 6.

The first braking force map is a map indicating the regenerative braking force generated depending on the vehicle speed and the deceleration depending on the regenerative braking force.

Note that the "regeneration" illustrated in FIG. 6 is a region corresponding to the regenerative braking force. The "regeneration limit line" illustrated in FIG. 6 is a line representing the upper limit of the regenerative braking force depending on the vehicle speed. Further, the "first threshold vehicle speed" illustrated in FIG. 6 corresponds to the border line between the change area in which the upper limit of the regenerative braking force changes depending on the change in the vehicle speed and the fixed area in which the upper limit of the regenerative braking force is constant. Note that the first threshold vehicle speed is set to, for example, 10 [km/h]. Accordingly, the change area in the first braking force map is an area in which the request value (request) of the regenerative braking force changes relative to the change in the vehicle speed calculated by the vehicle speed calculation unit 14.

In other words, the first braking force map is a map for determining the regenerative braking force (regeneration amount) generated at the driving motor DM by feeding back the vehicle speed calculated by the vehicle speed calculation unit 14. Accordingly, the first braking force map indicates that when the vehicle speed changes, the deceleration changes also.

Further, as illustrated in FIG. 6, the regeneration limit line is values for generating the regenerative braking force for stopping the vehicle C when the traveling road surface on which the vehicle C travels is flat (flat road) and only when the vehicle C travels, i.e., the vehicle speed exceeds "0 [km/h]". Accordingly, the regeneration limit line used for the flat traveling in FIG. 6 is a line representing the upper limit of the regenerative braking force depending on the vehicle speed in a state where the vehicle speed is "0[km/h]" and the deceleration and the regenerative braking force are zero.

The first request braking force calculation unit 52 refers to the corrected braking force included in the braking force distribution signal that is received from the braking/driving force distribution unit 48 and the vehicle speed included in the vehicle speed signal that is received from the vehicle speed calculation unit 14 and calculates the deceleration generated to the vehicle. The first request braking force calculation unit 52 calculates the first regenerative braking force as the regenerative braking force depending on the calculated deceleration, and outputs an information signal including the first regenerative braking force (hereinafter sometimes referred to as "first braking request signal") to the friction braking force control unit 6.

Specifically, to the first braking force map illustrated in FIG. 6, the vehicle speed included in the vehicle speed signal and the corrected braking force included in the braking force distribution signal are fed back and the first regenerative braking force is calculated.

In other words, the first request braking force calculation unit 52 calculates the first regenerative braking force depending on the corrected braking force obtained by correcting the basic braking force based on the direction of the road surface slope and the magnitude of the slope.

The operation amount of the accelerator pedal AP that is equal to or less than the braking/driving force switching operation amount corresponds to the operation amount of the accelerator pedal AP that is less than the threshold value set in advance.

Accordingly, the first request braking force calculation unit 52 calculates the first regenerative braking force (request value of regenerative braking force) depending on the operation amount of the accelerator pedal AP that is equal to or less than the braking/driving force switching operation amount (i.e. less than the threshold value set in advance) and the travelling speed of the vehicle.

The first request braking force calculation unit 52 calculates the first regenerative braking force with the regeneration limit line as the upper limit such that when the operation amount of the accelerator pedal AP detected by the accelerator sensor APS is within the braking range, until the vehicle is stopped, the vehicle speed calculated by the vehicle speed calculation unit 14 decreases. In other words, the first request braking force calculation unit 52 calculates the regenerative braking force for stopping the vehicle depending on the operation amount of the accelerator pedal AP when the operation amount of the accelerator pedal AP is equal to or less than the braking/driving force switching operation amount.

The regenerative braking force control unit 54 receives, from the friction braking force control unit 6, the regeneration request value signal. Additionally, from a battery BAT, a current State Of Charge (SOC) is acquired. The regenerative braking force control unit 54 refers to the request value of regenerative braking force included in the regeneration request value signal and the current state of charge of the battery BAT and calculates the regenerative execution amount.

A regenerative request amount is a target value of the regenerative braking force generated to the driving motor DM.

The regenerative execution amount is the regenerative braking force that is actually generated at the driving motor DM.

If the current state of charge is close to a full charge and it is not possible to charge the power generated by the regenerative braking to the battery BAT, the calculation is made by assuming that the regenerative execution amount is zero. Alternatively, when it is possible to charge the power generated by the regenerative braking to the battery BAT, the calculation is made by assuming that the regenerative request amount is equal to the regenerative execution amount (regenerative request amount=regenerative execution amount).

The regenerative braking force control unit 54 that has calculated the regenerative execution amount calculates the regenerative current command value.

The regenerative current command value is a current command value for generating the regenerative torque by the driving motor DM depending on the regenerative execution amount.

The regenerative braking force control unit 54 that has calculated the regenerative current command value outputs an information signal including the calculated regenerative current command value (hereinafter sometimes referred to as "regenerative torque signal") to the inverter INV and the friction braking force control unit 6.

Accordingly, the regenerative braking force control unit 54 generates, at the driving motor DM, the regenerative braking force depending on request value (request) of the regenerative braking force calculated by the friction braking force control unit 6. Note that the request value (request) of regenerative braking force calculated by the friction braking force control unit 6 is the request value (request) of regenerative braking force selected by a regenerative coordination control unit 64 described later.

(Detailed Configurations of Braking/Driving Force Correction Unit 44)

Figure 7:
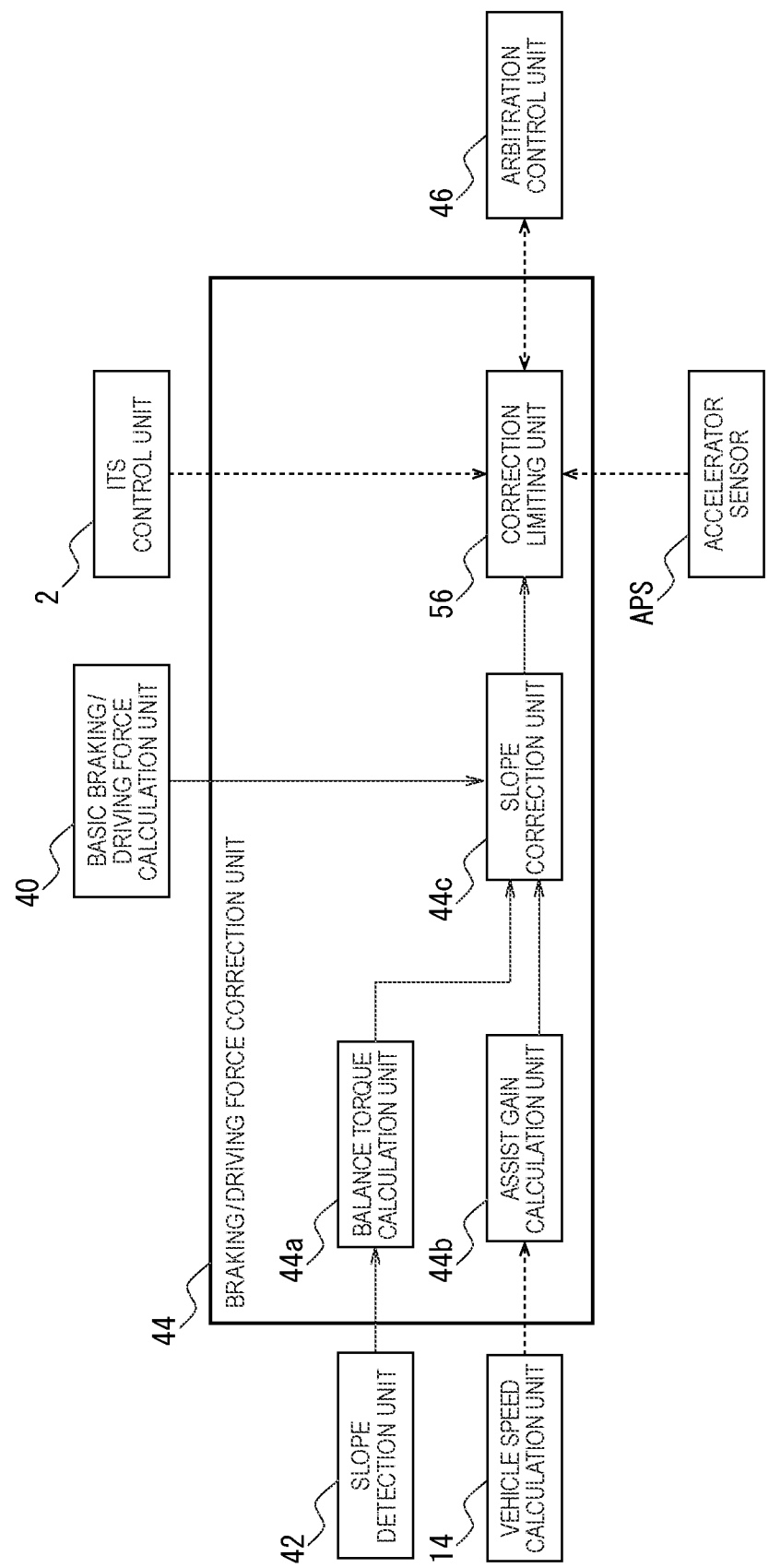
FIG. 7 is a block diagram illustrating a configuration of a braking/driving force correction unit.

The braking/driving force correction unit 44, as illustrated in FIG. 7, includes a balance torque calculation unit 44*a*, an assist gain calculation unit 44*b*, a slope correction unit 44*c*, and a correction limiting unit 56.

The balance torque calculation unit 44*a* calculates the balance torque based on the direction and the magnitude of the slope included in the road surface slope signal. In other words, the balance torque calculation unit 44*a* calculates the balance torque based on whether or not a direction of the road surface slope is an upstream direction or a downward direction and the magnitude of the road surface slope. The balance torque calculation unit 44*a* outputs an information signal including the calculated balance torque (hereinafter sometimes referred to as "balance torque signal") to the slope correction unit 44*c*.

The balance torque is a torque for enabling the vehicle C to maintain the stopped state on the traveling road surface. Further, the balance torque is calculated based on, for example, a weight of the vehicle C, a capability of generating the driving force, a capability of generating the regenerative braking force, and a capability of generating the friction braking force.

Accordingly, when the traveling road surface on which the vehicle C maintains the stopped state is the traveling road surface having the upward slope, the balance torque is the driving torque depending on the magnitude of the upward slope. On the other hand, when the traveling road surface on which the vehicle C maintains the stopped state is the traveling road surface having the descending slope, the balance torque is the braking torque depending on the magnitude of the descending slope.

In other words, the balance torque calculation unit 44*a* calculates the driving torque and the braking torque based on the direction of the road surface slope and the magnitude of the slope such that the driving torque and the braking torque can maintain the stopped state of the vehicle C on the traveling road surface in which the magnitude of the slope changes. Further, the balance torques are the driving torque and the braking torque that can maintain the stopped state of the vehicle C on the traveling road surface in which the magnitude of the slope changes.

The assist gain calculation unit 44*b* calculates the assist gain based on the direction and the magnitude of the slope set in advance and the vehicle speed included in the vehicle speed signal. Then, the assist gain calculation unit 44*b* outputs an information signal including the calculated balance assist gain (hereinafter sometimes referred to as "assist gain signal") to the slope correction unit 44*c*.

Figure 8:
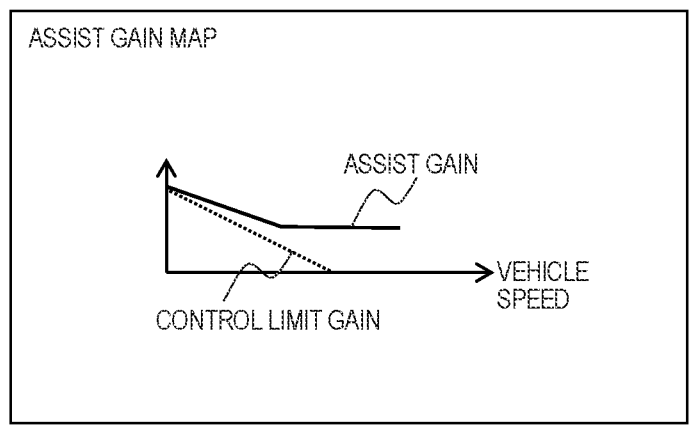
FIG. 8 is a drawing illustrating an assist gain map.

The assist gain is calculated by inputting the vehicle speed included in the vehicle speed signal to the assist gain map illustrated in FIG. 8. Note that the assist gain map illustrated in FIG. 8 indicates a relationship between the vehicle speed and the assist gain when the vehicle C travels on the road surface having the upward slope.

In the first embodiment, as one example, a case where the assist gain is changed in a range from "0" to "1" depending on the vehicle speed is described.

The direction and the magnitude of the slope set in advance is, for example, the slope of ±30% (the upward slope of 30% with the flat road as a reference and the descending slope of 30% with the flat road as the reference). Further, the assist gain map is generated with the assist torque generated with the slope of ±30% as a reference.

In the first embodiment, as one example, the slope of ±30% is set to the upper limit of the magnitude of the road surface slope set in advance. Note that the slope of ±30% is set, based on, for example, the travelling ability (gradeability) of the vehicle C. Thus, when the braking/driving force control device 1 according to the first embodiment is applied to a vehicle having a different travelling ability (gradeability) from that of the vehicle C, a slope may be, for example, a slope of ±20% or a slope of ±40%.

Accordingly, in the first embodiment, the decrease degree of the assist gain that decreases as the vehicle speed increases is set based on the upper limit of the magnitude of the road surface slope set in advance. Specifically, as the slope is large, the decrease degree of the assist gain that decreases as the vehicle speed increases is small. Further, as the slope is large, the decrease degree of the assist gain that decreases as the vehicle speed increases is large.

The assist gain map illustrated in FIG. 8 is formed, as similar to the braking/driving force map illustrated in FIG. 5, such that the degree of change of the assist gain relative to the change in the vehicle speed calculated by the vehicle speed calculation unit 14 is equal to or less than the control limit gain. In other words, in the assist gain map illustrated in FIG. 8, the degree of decrease of the assist gain that decreases as the vehicle speed increases is equal to or less than the control limit gain.

From the above, the assist gain calculation unit 44*b* calculates the assist gain that is a maximum value when the vehicle speed is the set vehicle speed set in advance and decreases from the maximum value as the vehicle speed increases from the set vehicle speed.

In the first embodiment, as one example, a case where the set vehicle speed is set to "0 [km/h]" is described.

Further, in the first embodiment, as one example, the maximum value of the degree of decrease of the assist gain is set to 50% (half of assist gain when vehicle speed is "0 [km/h]").

The slope correction unit 44*c* receives information signals from the basic braking/driving force calculation unit 40, the balance torque calculation unit 44*a*, and the assist gain calculation unit 44*b*. The slope correction unit 44*c* corrects the target braking torque or the target driving torque included in the basic drive torque signal using the balance torque included in the balance torque signal and the assist gain included in the assist gain signal.

The slope correction unit 44c that has corrected the target braking torque using the balance torque and the assist gain outputs an information signal including the corrected target braking torque that is the corrected braking force (hereinafter sometimes referred to as "corrected braking force signal") to the correction limiting unit 56.

On the other hand, the slope correction unit 44c that has corrected the target driving torque using the balance torque and the assist gain outputs an information signal including the corrected target driving torque that is the corrected driving force (hereinafter sometimes referred to as "corrected driving force signal") to the correction limiting unit 56.

Figure 9:
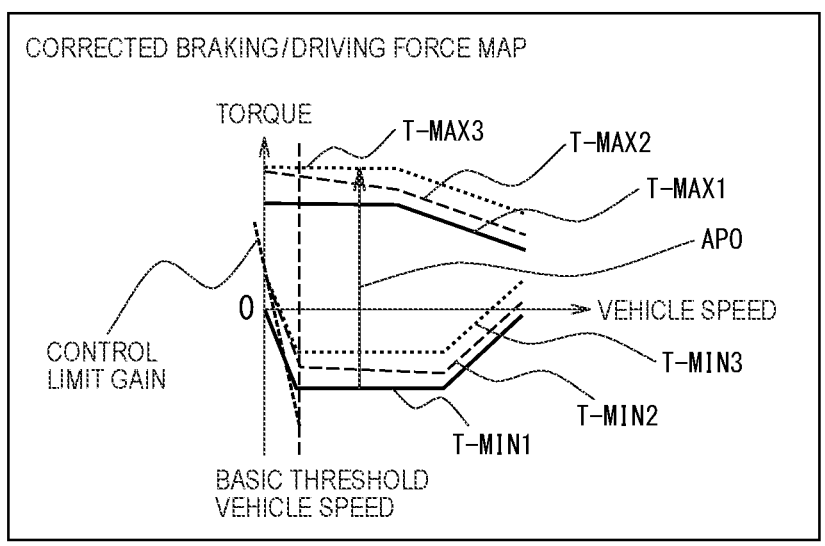
FIG. 9 is a drawing illustrating a corrected braking/driving force map.

The corrected braking force and the corrected driving force are represented as images in the "corrected braking/driving force map" illustrated in FIG. 9.

The corrected braking/driving force map, for example, as illustrated in FIG. 9, is a map indicating a relationship among the vehicle speed, the operation amount (opening degree) of the accelerator pedal AP, and the torque (driving torque, braking torque) generated to the vehicle.

The corrected braking/driving force map is a map obtained by correcting the "T-MIN1" and the "T-MAX1" in the braking/driving force map based on the balance torque and the assist gain. Note that the corrected braking/driving force map illustrated in FIG. 9 indicates a case where the torque generated to the vehicle C (driving torque, braking torque) is corrected based on the vehicle speed and the operation amount of the accelerator pedal AP when the vehicle C travels on the road surface having the upward slope.

Note that in FIG. 9, as similar to FIG. 5, the operation amount (opening degree) of the accelerator pedal AP is denoted with the reference numeral "APO". Further, in FIG. 9, as similar to FIG. 5, the torque generated depending on the vehicle speed when the operation amount of the accelerator pedal AP is the minimum value (unoperated) is denoted with the reference numeral "T-MIN1". In FIG. 9, as similar to FIG. 5, the torque generated depending on the vehicle speed when the operation amount of the accelerator pedal AP is a maximum value (pedaling operation amount is maximum) is denoted with the reference numeral "T-MAX1".

In FIG. 9, as similar to FIG. 5, the driving torque and the braking torque are represented on a longitudinal axis with "0" as a border line.

In the process of correcting the "T-MIN1" and "T-MAX1" of the braking/driving force map, first, the balance torque calculated by the balance torque calculation unit 44a is multiplied by the assist gain calculated by the assist gain calculation unit 44b. The "T-MIN1" and "T-MAX1" of the braking/driving force map are corrected based on the value obtained by multiplying the balance torque by the assist gain. Accordingly, the torque generated to the vehicle C is corrected.

Note that in FIG. 9, a value obtained by correcting the "T-MIN1" of the braking/driving force map based on the value obtained by multiplying the balance torque by the assist gain is denoted with the reference numeral "T-MIN2". Further, in FIG. 9, a value obtained by correcting the "T-MAX1" of the braking/driving force map based on the value obtained by multiplying the balance torque by the assist gain is denoted with the reference numeral "T-MAX2".

Further, in FIG. 9, a value obtained by correcting the "T-MIN1" of the braking/driving force map based on the balance torque is denoted with the reference numeral "T-MIN3". Further, in FIG. 9, a value obtained by correcting the "T-MAX1" of the braking/driving force map based only on the balance torque is denoted with the reference numeral "T-MAX3".

Accordingly, the "T-MIN2" obtained by correcting the "T-MIN1" based on the value obtained by multiplying the balance torque by the assist gain takes a smaller value than that of the "T-MIN3" obtained by correcting the "T-MIN1" based only on the balance torque as the vehicle speed is fast. Similarly, the "T-MAX2" obtained by correcting the "T-MAX1" based on the value obtained by multiplying the balance torque by the assist gain takes a smaller value than that of the "T-MAX3" obtained by correcting the "T-MAX1" based only on the balance torque as the vehicle speed is fast.

With respect to the "T-MIN2" and the "T-MIN3", in the region not greater than the basic threshold vehicle speed of the braking/driving force map, as similar to the "T-MIN1", the degree of change of the torque relative to the change in the vehicle speed calculated by the vehicle speed calculation unit 14 is equal to or less than the control limit gain. In other words, with respect to the "T-MIN2" and the "T-MIN3", in the region not greater than the basic threshold vehicle speed, the degree of change of the torque relative to the change in the vehicle speed calculated by the vehicle speed calculation unit 14 is equal to or less than the control limit gain in a state where the operation amount of the accelerator pedal AP is a minimum value. Note that FIG. 9 illustrates the control limit gain that is changed depending on the balance torque.

As illustrated in FIG. 9, when the vehicle C travels on the road surface having the upward slope, the torque in a state where the operation amount of the accelerator pedal AP is the minimum value becomes the braking torque or the driving torque depending on the vehicle speed.

The correction limiting unit 56 receives information signals from the slope correction unit 44c, the accelerator sensor APS, the ITS control state output unit 26, and the arbitration control unit 46.

The correction limiting unit 56, as illustrated in FIG. 10, includes a limiting value setting unit 56a, an upper limit value storage unit 56b, a lower limit value storage unit 56c, a limit value multiplication unit 56d, an upper limit value switching unit 56e, an upper limit value correction unit 56f, and a restriction processing unit 56g.

The limiting value setting unit 56a stores in advance a map indicating a relationship between the operation amount (opening degree) of the accelerator pedal AP and the slope correction limit value used for the process of limiting the corrected braking force and the corrected driving force (see drawing). Note that, in the drawing, the operation amount (opening degree) of the accelerator pedal AP is denoted with the reference numeral "APO" and represented on a longitudinal axis. Similarly, in the drawing, the slope correction limit value is represented on the longitudinal axis.

The limiting value setting unit 56a receives, from the accelerator sensor APS, an information signal including the operation amount of the accelerator pedal AP (braking/driving force operation amount). The limiting value setting unit 56a inputs the operation amount of the accelerator pedal AP to the stored map and sets the slope correction limit value. Further, the limiting value setting unit 56a outputs the set slope correction limit value to the limit value multiplication unit 56d.

Note that in the first embodiment, as one example, as illustrated in the drawing, a case where the limiting value setting unit 56a sets the constant slope correction limit value (for example, "0.2") regardless of the operation amount of the accelerator pedal AP is described.

The upper limit value storage unit 56b stores the upper limiter value set in advance.

The upper limiter value is the upper limit used for the process of limiting the corrected braking force or the corrected driving force.

The lower limit value storage unit 56c stores the lower limiter value set in advance.

The lower limiter value is a lower limit value used for the process of limiting the corrected braking force or the corrected driving force.

The limit value multiplication unit 56d multiplies the slope correction limit value set by the limiting value setting unit 56a by the upper limiter value stored by the upper limit value storage unit 56b. The limit value multiplication unit 56d outputs a multiplied value to the upper limit value switching unit 56e.

The upper limit value switching unit 56e is formed by using, for example, a switching circuit. The upper limit value switching unit 56e can switch a state between a state where the limit value multiplication unit 56d is connected with the upper limit value correction unit 56f and a state where the limit value storage unit 56b is connected with the upper limit value correction unit 56f.

The upper limit value switching unit 56e refers to the ITS determination signal input from the ITS control state output unit 26 and the Dr override determination signal received from the arbitration control unit 46. When the respective information signals includes the determination result in which the braking force or the driving force is controlled depending on the automatic speed control or the control object, and, the determination result in which the driver override is not established, the limit value multiplication unit 56d is connected with the upper limit value correction unit 56f. On the other hand, when the respective information signals includes the determination result in which the braking force or the driving force is controlled depending on the automatic speed control or the control object and the determination result in which the driver override is established, the upper limit value storage unit 56b is connected with the upper limit value correction unit 56f.

Note that FIG. 10 illustrates a case where the upper limit value switching unit 56e is switched to a state where the limit value multiplication unit 56d is connected with the upper limit value correction unit 56f.

Depending on the connection state switched by the upper limit value switching unit 56e, the upper limit value correction unit 56f applies a change rate limiter on a value obtained by multiplying the slope correction limit value by the upper limiter value or the upper limiter value to suppress a sudden change at the time of output. The upper limit value correction unit 56f outputs the value processed by the change rate limiter to the restriction processing unit 56g.

The restriction processing unit 56g uses the value received from the upper limit value correction unit 56f and the lower limiter value stored by the lower limit value storage unit 56c to conduct the process of limiting the corrected braking force or the corrected driving force included in the information signal received from the slope correction unit 44c.

Specifically, the upper limit of the corrected braking force or the corrected driving force is limited to the value received from the upper limit value correction unit 56f. Additionally, the lower limit value of the corrected braking force or the corrected driving force is limited to the lower limiter value.

In other words, the restriction processing unit 56g conducts the process of limiting the corrected braking force or the corrected driving force to a range between the value received from the upper limit value correction unit 56f and the lower limiter value.

The correction limiting unit 56 that has limited the corrected braking force outputs an information signal including the limited corrected braking force that is the limited braking force (hereinafter sometimes referred to as the "limited braking force signal") to the arbitration control unit 46.

On the other hand, the correction limiting unit 56 that has limited the corrected driving force outputs an information signal including the limited corrected driving force that is the limited driving force (hereinafter sometimes referred to as "the limited driving force signal") to the arbitration control unit 46.

From the above, the correction limiting unit 56 conducts the process of limiting the corrected braking force or the corrected driving force using a value obtained by multiplying the slope correction limit value by the upper limiter value or, the upper limiter value, and the lower limiter value.

Further, in the first embodiment, the process by the upper limit value correction unit 56f using the change rate limiter suppresses the rapid change of the braking force at the start and the end of the process for limiting the corrected braking force to enable a smooth process. Similarly, at the start and the end of the process for limiting the corrected driving force, the rapid change in the driving force can be suppressed and the smooth process can be conducted.

From the above, the braking/driving force correction unit 44 corrects the basic braking force or the basic driving force based on the direction of the road surface slope and the magnitude of the slope to calculate the corrected braking force or the corrected driving force.

Specifically, when the slope detection unit 42 determines that the direction of the road surface slope is the upstream direction and the magnitude of the slope detected by the slope detection unit 42 increases in the upstream direction, the braking force generated to the vehicle C is set to the corrected braking force obtained by correcting to decrease the basic braking force depending on the magnitude of the slope. Alternatively, the driving force generated to the vehicle C is set to the corrected driving force obtained by correcting to increase the basic driving force depending on the magnitude of the slope.

On the other hand, when the slope detection unit 42 determines that the direction of the road surface slope is the downward direction and the magnitude of the slope detected by the slope detection unit 42 increases in the downward direction, the braking force generated to the vehicle C is set to the corrected braking force obtained by correcting to increase the basic braking force depending on the magnitude of the slope. Alternatively, the driving force generated to the vehicle C is set to the corrected driving force obtained by correcting to decrease the basic driving force depending on the magnitude of the slope.

Note that a state where the direction of the road surface slope increase in the upstream direction includes a state where the traveling road surface changes from the flat road to an uphill and a state where the traveling road surface changes from the uphill to the uphill having the large slope in the upstream direction. Additionally, a state where the direction of the road surface slope is increased to the upstream direction includes a state where the traveling road surface changes form the downhill to the downhill having a small slope in the downward direction.

A state where the direction of the road surface slope increases in the downward direction includes a state where the traveling road surface changes from the flat road to the downhill and a state where the traveling road surface changes from the downhill to the downhill having the large slope in the downward direction. Additionally, a state where the direction of the road surface slope increases in the downward direction includes a state where the traveling road surface changes form the uphill to the uphill having a small slope in the upstream direction.

Further, the braking/driving force correction unit 44 sets the corrected braking force or the corrected driving force such that when the operation amount of the accelerator pedal AP is less than the threshold value, the braking force (deceleration) is generated to the vehicle C, and when the operation amount of the accelerator pedal AP is equal to or larger than the threshold value, the driving force (acceleration) is generated to the vehicle C.

The braking/driving force correction unit 44 continuously corrects to increase or decrease the basic braking force and the basic driving force calculated by the braking/driving force map, depending on the balance torque calculated by the balance torque calculation unit 44a.

Further, the braking/driving force correction unit 44 continuously corrects to increase or decrease the basic braking force and the basic driving force calculated by the braking/driving force map. The correction is made based on a value obtained by multiplying the balance torque calculated by the balance torque calculation unit 44a by the assist gain calculated by the assist gain calculation unit 44b.

Accordingly, the braking/driving force correction unit 44 corrects the basic braking force based on the direction of the road surface slope and the magnitude of the slope to set the corrected braking force. Further, the braking/driving force correction unit 44 corrects the basic driving force based on the direction of the road surface slope and the magnitude of the slope to set the corrected driving force.

As described above, the braking/driving force correction unit 44, when the magnitude of the road surface slope increases, corrects to increase the basic driving force based on the magnitude of the road surface slope, or corrects to decrease the basic braking force based on the magnitude of the road surface slope. The braking/driving force correction unit 44, when the magnitude of the road surface slope decreases, corrects to decrease the basic driving force based on the magnitude of the road surface slope, or corrects to increase the basic braking force based on the magnitude of the road surface slope.

(Detailed Configurations of the Friction Braking Force Control Unit 6)

Figure 11:
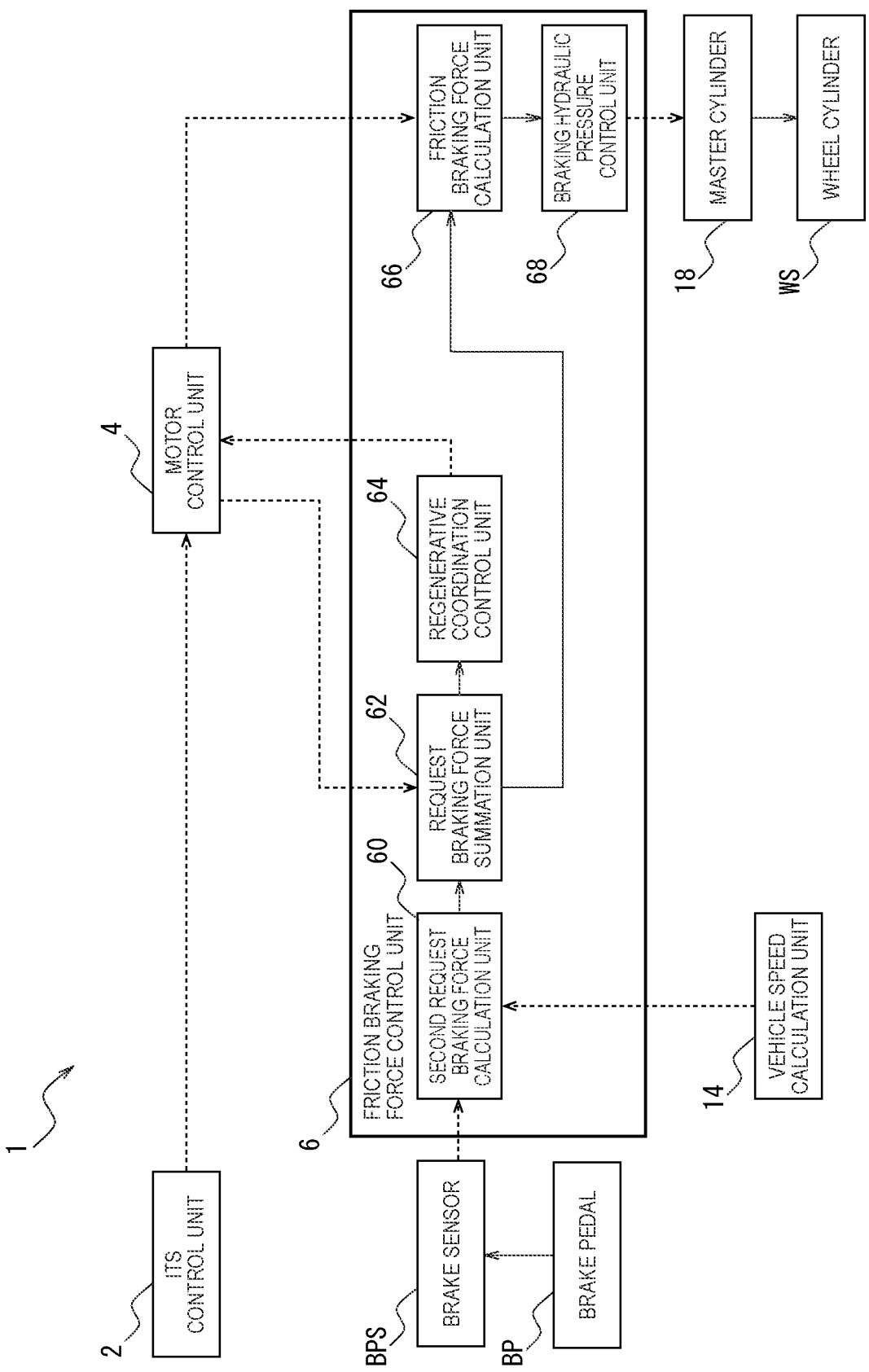
FIG. 11 is a block diagram illustrating a configuration of a friction braking force control unit.

A friction braking force control unit 6, as illustrated in FIG. 11, includes a second request braking force calculation unit 60, a request braking force summation unit 62, a regenerative coordination control unit 64, a friction braking force calculation unit 66, and a braking hydraulic pressure control unit 68.

The second request braking force calculation unit 60 receives, form the brake sensor BPS, an information signal including the operation amount (braking force operation amount) of the brake pedal BP. Additionally, the second request braking force calculation unit 60 receives, from the vehicle speed calculation unit 14, the vehicle speed signal.

Note that the brake pedal BP is a pedal provided to the vehicle, is a pedal pedaled by the driver of the vehicle in response to the braking force request, and is provided separately from the accelerator pedal AP.

Figure 12:
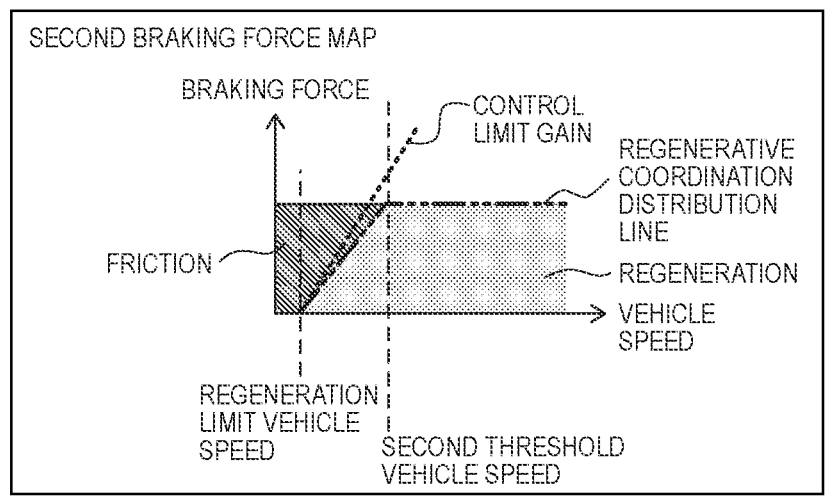
FIG. 12 is a drawing illustrating a second braking force map.

The second request braking force calculation unit 60 stores in advance the second braking force map illustrated in FIG. 12.

The second braking force map is a map indicating the braking force (regenerative braking force, friction braking force) that is generated depending on the operation amount of the brake pedal BP and the travelling speed (vehicle speed) of the vehicle C.

Note that the "regeneration" in FIG. 12 is the region corresponding to the regenerative braking force. Further, the "friction" in FIG. 12 is the region corresponding to the friction braking force. Further, the "regenerative coordination distribution line" in FIG. 12 is a line representing the upper limit of the regenerative braking force depending on the operation amount of the brake pedal BP and the vehicle speed.

The "second threshold vehicle speed" in FIG. 12 corresponds to a border line between the change area in which the upper limit of the regenerative braking force changes depending on the change in the vehicle speed and the fixed area in which the upper limit of the regenerative braking force is constant. Note that the second threshold vehicle speed is set to, for example, 10 [km/h]. Accordingly, the change area in the second braking force map is the area in which the request value of regenerative braking force changes relative to the change in the vehicle speed calculated by the vehicle speed calculation unit 14.

The "control limit gain" in FIG. 12 is the upper limit of the degree of change of the regenerative braking force depending on the vehicle speed not greater than the second threshold vehicle speed. Further, the line represented by control limit gain in FIG. 12, as similar to the line represented by the control limit gain in FIG. 6, corresponds to a border line between a state where the control of the current command value is stable and a state where the control of the current command value is unstable. In other words, the control limit gain in FIG. 12 is the upper limit of the degree of change of the deceleration depending on the regenerative braking force relative to the vehicle speed in which the change in the vehicle speed calculated by the vehicle speed calculation unit 14 can follow the change in the deceleration depending on the regenerative braking force.

Accordingly, in the change area of the second braking force map, the degree of change of the request value of regenerative braking force (deceleration depending on regenerative braking force) relative to the change in the vehicle speed calculated by the vehicle speed calculation unit 14 is equal to or less than the control limit gain.

The "regeneration limit vehicle speed" in FIG. 12 corresponds to the border line between the region in which the braking force depending on the operation amount of the brake pedal BP and the vehicle speed is generated only with the friction braking force and the region in which the braking force depending on the operation amount of the brake pedal BP and the vehicle speed is generated at least with the regenerative braking force out of the regenerative braking force and the friction braking force.

As illustrated in FIG. 12, the regeneration limit vehicle speed is set to a value for generating the braking force that depends on the operation amount of the brake pedal BP and the vehicle speed only with the friction braking force when the vehicle C decelerates and in a state where the vehicle speed is larger than zero, i.e., in a state before the travelling vehicle C stops. This is because in a state where the vehicle speed is equal to or less than the regeneration limit vehicle speed (for example, 3 [km/h]), the power consumed by the driving motor DM to generate the regenerative braking force exceeds the power generated by the regenerative braking force, as the entire vehicle, the energy efficiency is lowered.

To maintain the stopped state of the vehicle C (to maintain a state where vehicle speed is 0 [km/h]), the friction braking force is preferably used rather than using the regenerative braking force to have a good energy efficiency. Thus, when the brake pedal BP is operated and the stopped state of the vehicle C is maintained, only the friction braking force is generated.

Accordingly, the regenerative coordination distribution line is a value for generating the regenerative braking force only when the vehicle C is travelling.

The second request braking force calculation unit 60 refers to the operation amount of the brake pedal BP and the vehicle speed included in the vehicle speed signal and calculates a second braking request that is a request (request value) of the braking force depending on the operation amount of the brake pedal BP and the vehicle speed.

The second braking request includes at least one of the request values out of the request value of the regenerative braking force (second regenerative braking force) and the request value of the friction braking force that depend on the operation amount of the brake pedal BP and the vehicle speed.

The request values of the regenerative braking force and the friction braking force depending on the operation amount of the brake pedal BP and the vehicle speed are calculated by feeding back, to the second braking force map in FIG. 12, for example, the vehicle speed included in the vehicle speed signal and the braking force depending on the operation amount of the brake pedal BP. Note that when the vehicle speed included in the vehicle speed signal exceeds the second threshold vehicle speed, the calculation is made by assuming that the request value of the friction braking force is zero.

The second request braking force calculation unit 60 that has calculated the second braking request outputs an information signal including the second braking request (hereinafter sometimes referred to as "second braking request signal") to the request braking force summation unit 62.

Accordingly, when the brake pedal BP is operated, the second request braking force calculation unit 60 calculates the request value (request) of the regenerative braking force (second regenerative braking force) based on the operation amount of the brake pedal BP and the travelling speed of the vehicle C with the regenerative coordination distribution line as the upper limit. Additionally, when the brake pedal BP is operated, the second request braking force calculation unit 60 calculates the braking force exceeding the regenerative coordination distribution line as the request value (request) of the friction braking force based on the operation amount of the brake pedal BP and the travelling speed of the vehicle C.

Further, the second request braking force calculation unit 60 calculates the second braking request such that a portion of the braking forces depending on the operation amount of the brake pedal BP detected by the brake sensor BPS, the braking force exceeding the regenerative coordination distribution line is generated with the friction braking force.

The second request braking force calculation unit 60, only when the vehicle speed exceeds the regeneration limit vehicle speed, with the regenerative coordination distribution line as the upper limit, calculates the second regenerative braking force.

The request braking force summation unit 62 receives, from the first request braking force calculation unit 52 and the second request braking force calculation unit 60, information signals.

The request braking force summation unit 62 outputs an information signal including the first regenerative braking force (hereinafter sometimes referred to as "first regenerative signal") to the regenerative coordination control unit 64. Further, the request braking force summation unit 62, when the second braking request includes the second regenerative braking force, outputs an information signal including the second regenerative braking force (hereinafter sometimes referred to as "second regenerative signal") to the regenerative coordination control unit 64.

The request braking force summation unit 62 sums the first regenerative braking force included in the first braking request signal and the second braking request included in the second braking request signal. In other words, the request braking force summation unit 62 sums the first regenerative braking force calculated by the first request braking force calculation unit 52 and the second regenerative braking force and the friction braking force that are calculated by the second request braking force calculation unit 60.

The request braking force summation unit 62 that has summed each of the braking forces outputs an information signal including the request value (summation request braking force) of the summed braking force (hereinafter sometimes referred to as "sum braking force signal") to the friction braking force calculation unit 66.

The regenerative coordination control unit 64 receives, from the request braking force summation unit 62, either one of the first regenerative signal and the second regenerative signal.

The regenerative coordination control unit 64, using the summation request braking force included in the sum braking force signal, selects the request value (upper limit) of the regenerative braking force.

The regenerative coordination control unit 64 that has selected the request value of regenerative braking force outputs a regeneration request value signal that is an information signal including the selected request value to the regenerative braking force control unit 54.

Specifically, the regenerative coordination control unit 64 compares the first regenerative braking force included in the first regenerative signal with the second regenerative braking force included in the second regenerative signal and selects a larger regenerative braking force (select-high). Then, the regenerative coordination control unit 64 selects this regenerative braking force as the request value of regenerative braking force.

Figure 13:
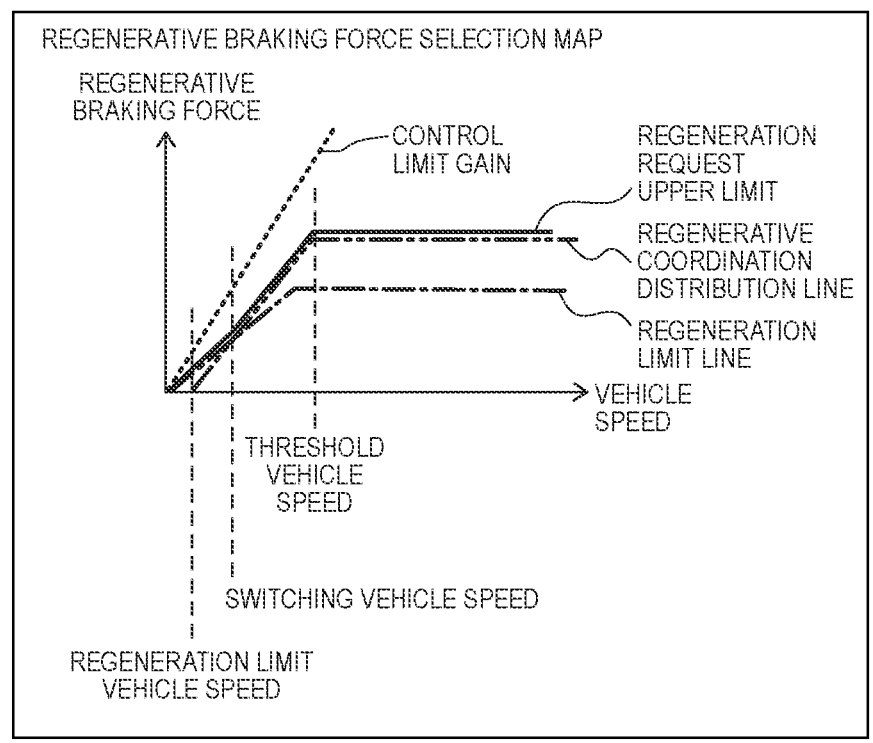
FIG. 13 is a drawing illustrating a regenerative braking force selection map.

In other words, when the regenerative coordination control unit 64 selects the request value of regenerative braking force, the regenerative coordination control unit 64 inputs to the map illustrated in FIG. 13, for example, the first regenerative braking force and the second regenerative braking force that depend on the identical vehicle speed. The regenerative coordination control unit 64 selects a larger regenerative braking force out of the first regenerative braking force and the second regenerative braking force.

The map (regenerative braking force selection map) illustrated in FIG. 13 is a map indicating a relationship among the first regenerative braking force, the second regenerative braking force, and the vehicle speed.

Note that the "regeneration limit line" illustrated in FIG. 13 is similar to the "regeneration limit line" illustrated in FIG. 6 and the "regenerative coordination distribution line"

illustrated in FIG. 13 is similar to the "regenerative coordination distribution line" illustrated in FIG. 12.

The "regeneration request upper limit" illustrated in FIG. 13 is a line obtained by continuing values each of which is larger one among a value on the regeneration limit line and a value on the regenerative coordination distribution line at the same vehicle speed.

The "threshold vehicle speed" in FIG. 13 corresponds to the border line between the change area in which the upper limit of the regenerative braking force changes depending on the change in the vehicle speed and the fixed area in which the upper limit of the regenerative braking force is constant. Note that the threshold vehicle speed is, as similar to the first threshold vehicle speed and the second threshold vehicle speed, set to, for example, 10 [km/h].

The "control limit gain" illustrated in FIG. 3 is similar to the "control limit gain" illustrated in FIGS. 5, 6, 8, and 9.

The "switching vehicle speed" illustrated in FIG. 13 corresponds to the border line between the region in which the regeneration request upper limit is the regeneration limit line and the region in which the regeneration request upper limit is the regenerative coordination distribution line. Further, the "regeneration limit vehicle speed" in FIG. 13 is similar to the "regeneration limit vehicle speed" in FIG. 12.

Note that the switching vehicle speed is set in advance based on, for example, the performance•specification (car weight, performance of driving motor DM and the like) of the vehicle C.

From the above, the regenerative coordination control unit 64, while decelerating, when the brake pedal BP is operated, selects a larger regenerative braking force out of the first regenerative braking force calculated by the first request braking force calculation unit 52 or the second regenerative braking force calculated by the second request braking force calculation unit 60.

As illustrated in FIG. 13, the regeneration request upper limit is equivalent to the regenerative coordination distribution line in the region where the vehicle speed is equal to or greater than the switching vehicle speed. Further, the regeneration request upper limit is equivalent to regeneration limit line in the region where the vehicle speed is less than the switching vehicle speed.

Accordingly, the regenerative coordination control unit 64, if the vehicle C is travelling (if the vehicle C is not stopped), selects the regeneration request upper limit as a value greater than zero.

As illustrated in FIG. 13, the inclination angle of the line represented by the regeneration request upper limit is equal to or less than the inclination angle of the line represented by the control limit gain even if the vehicle speed is less than the threshold vehicle speed, the switching vehicle speed, and regeneration limit vehicle speed.

From the above, when the operation amount of the accelerator pedal AP is less than the threshold value and the brake pedal BP is operated, the regenerative coordination control unit 64 selects a larger request value out of the request values calculated by the first request braking force calculation unit 52 and the second request braking force calculation unit 60. In other words, when the operation amount of the accelerator pedal AP is less than the threshold value and the brake pedal BP is operated, the regenerative coordination control unit 64 selects a larger regenerative braking force out of the first regenerative braking force and the second regenerative braking force. Note that in the first embodiment, as one example, a case where when the operation amount of the accelerator pedal AP is less than the threshold value, until the vehicle C is stopped, the regenerative braking force is generated and the vehicle speed is decreased is described.

The friction braking force calculation unit 66 receives, from the request braking force summation unit 62, the sum braking force signal and receives, from the regenerative braking force control unit 54, the regenerative torque signal. The friction braking force calculation unit 66 subtracts, from the summation request braking force included in the sum braking force signal, the regenerative execution amount included in the regenerative torque signal and calculates a friction execution amount.

The friction execution amount is the friction braking force that is actually generated at the wheel W.

The friction braking force calculation unit 66 that has calculated the friction execution amount calculates the friction braking force command value.

The friction braking force command value is the target value of the liquid pressure generated at a master cylinder 18 for generating the friction braking force depending on the friction execution amount.

The friction braking force calculation unit 66 that has calculated the friction braking force command value outputs an information signal including the calculated friction braking force command value (hereinafter sometimes referred to as "friction braking force signal") to the braking hydraulic pressure control unit 68.

The braking hydraulic pressure control unit 68 outputs the friction braking force command value to the master cylinder 18.

The master cylinder 18 is a device for supplying, to a wheel cylinder WS, a brake fluid.

The master cylinder 18 that has received the friction braking force command value actuates the braking motor (not illustrated) or the like built in, for example, the master cylinder 18 to actuate the piston in the master cylinder 18. Accordingly, in the master cylinder 18, the liquid pressure depending on the friction braking force command value is generated. Then, the brake fluid of the liquid pressure depending on the friction braking force command value is supplied to the wheel cylinder WS. Note that detailed configurations of the wheel cylinder WS are described later.

As described above, the friction braking force control unit 6, at the master cylinder 18 and the wheel cylinder WS, generates the friction braking force to the wheel W of the vehicle C.

The friction braking force control unit 6 generates, at the master cylinder 18 and the wheel cylinder WS, the friction braking force depending on the deviation between the request values summed by the request braking force summation unit 62 and the regenerative braking force generated at the driving motor DM by the regenerative braking force control unit 54.

Note that in a state where, for example, an information signal indicating that the driver operates the brake pedal BP is received, if an information signal indicating that the driver operates the accelerator pedal AP is received, the braking/driving force control device 1 conducts, for example, the calculation processes by assuming that the target driving torque is zero.

(Configuration of Vehicle C)

With reference to FIG. 1 to FIG. 13, configurations of the vehicle C having the braking/driving force control device 1 are described.

As illustrated in FIG. 2, the vehicle C having the braking/driving force control device 1 includes the accelerator pedal AP, the accelerator sensor APS, the brake pedal BP, the brake sensor BPS, the wheel speed sensor 16, and the motor rotation speed sensor MS. Additionally, the vehicle C includes the ITS control unit 2, the motor control unit 4, and the friction braking force control unit 6. Further, the vehicle C includes the master cylinder 18, the wheel cylinder WS, the battery BAT, the inverter INV, the driving motor DM, the transmission TR, and the wheel W (a right front wheel WFR, a left front wheel WFL, a right rear wheel WRR, and a left rear wheel WRL).

The accelerator pedal AP is a pedal pedaled by the driver of the vehicle C in response to the braking force request or the driving force request.

The accelerator sensor APS is a sensor that detects the operation amount of the accelerator pedal AP (pedaling operation amount) by the driver.

The accelerator sensor APS outputs an information signal including the operation amount of the accelerator pedal AP by the driver to the motor control unit 4.

Note that the accelerator sensor APS is formed using, for example, the pedal stroke sensor. Further, a configuration of the accelerator sensor APS is not limited to a configuration of being formed using the pedal stroke sensor, but may be a configuration in which the opening degree of the accelerator pedal AP by the pedaling operation of the driver is detected.

In other words, the accelerator sensor APS is a sensor that detects the operation amount of the accelerator pedal AP by the driver.

The brake pedal BP is a pedal pedaled by the driver of the vehicle C in response to the braking force request and is provided separately from the accelerator pedal AP.

The brake sensor BPS is a sensor that detects the operation amount (pedaling operation amount) of the brake pedal BP by the driver.

The brake sensor BPS outputs an information signal including the operation amount of the brake pedal BP by the driver to the friction braking force control unit 6.

Note that the brake sensor BPS is formed using, for example, the pedal stroke sensor. A configuration of the brake sensor BPS is not limited to a configuration of being formed using the pedal stroke sensor, but may be a configuration in which, for example, the opening degree of the brake pedal BP by the pedaling operation of the driver is detected.

In other words, the brake sensor BPS is a sensor that detects the operation amount of the brake pedal BP by the driver.

The wheel speed sensor 16 is provided to each of the wheels W in a corresponding manner.

The wheel speed sensor 16, for one revolution of the corresponding wheel W, generates the predetermined number of wheel speed pulses. The wheel speed sensor 16 outputs an information signal including the generated wheel speed pulse (hereinafter sometimes referred to as "wheel speed pulse signal") to the vehicle speed calculation unit 14.

Note that in FIG. 2, the wheel speed sensor 16 that generates the wheel speed pulse for one revolution of the right front wheel WFR is represented as the wheel speed sensor 16FR and the wheel speed sensor 16 that generates the wheel speed pulse for one revolution of the left front wheel WFL is represented as the wheel speed sensor 16FL. Similarly, in FIG. 2, the wheel speed sensor 16 that generates the wheel speed pulse for one revolution of the right rear wheel WRR is represented as the wheel speed sensor 16RR and the wheel speed sensor 16 that generates the wheel speed pulse for one revolution of the left rear wheel WRL is represented as the wheel speed sensor 16RL. In the following descriptions also, each of the wheels W and each of the wheel speed sensors 16 may be represented as above.

The motor rotation speed sensor MS detects the rotation speed (rotation state) of the motor driving force output shaft based on the output shaft pulse signal. The motor rotation speed sensor MS outputs the output shaft rotation speed signal including the detected rotation speed to the motor control unit 4.

The output shaft pulse signal is a pulse signal representing a rotation state of the motor driving force output shaft.

Descriptions of the ITS control unit 2, the motor control unit 4, the friction braking force control unit 6, and a master cylinder 18 are omitted because descriptions of those elements are already made.

A wheel cylinder WS generates the pressing force for pressing the brake pad (not illustrated) included in the disc brake to the disc rotor (not illustrated). The disc rotor rotates together with each of the wheels W, contacts the brake pad and generates the friction resistance.

In other words, the master cylinder 18 and each of the wheel cylinders WS are respectively provided to a front wheel WF and a rear wheel WR and form a friction brake that generates the friction braking force to each of the wheels W.

Accordingly, the friction brake of the vehicle C generates the friction braking force to all of the wheels W (right front wheel WFR, left front wheel WFL, right rear wheel WRR, and left rear wheel WRL).

Note that in FIG. 2, the wheel cylinder WS arranged for the right front wheel WFR is represented as the wheel cylinder WSFR and the wheel cylinder WS arranged for the left front wheel WFL is represented as the wheel cylinder WSFL. Similarly, in FIG. 2, the wheel cylinder WS arranged for the right rear wheel WRR is represented as the wheel cylinder WSRR and the wheel cylinder WS arranged for the left rear wheel WRL is represented as the wheel cylinder WSRL. In the following descriptions also, each of the wheel cylinders WS may be represented as above.

The battery BAT is formed using, for example, a lithium ion battery.

To the battery BAT, a battery controller (not illustrated) that can detect a current value, a voltage value, a temperature and the like of the battery BAT is provided. The battery controller detects the SOC of the battery BAT and outputs an information signal including the detected SOC to the regenerative braking force control unit 54.

To the battery BAT, the power generated by the driving motor DM through the regenerative braking is charged via the inverter INV.

When the inverter INV receives, from the driving force control unit 50, the driving current command value, the inverter INV outputs the driving current command value included in driving torque signal to the driving motor DM. When the inverter INV receives, from the regenerative braking force control unit 54, the regenerative torque signal, the inverter INV outputs the regenerative current command value included in the regenerative torque signal to the driving motor DM.

When the driving motor DM receives, from the inverter INV, the driving current command value, the driving motor DM generates the driving force depending on the driving current command value.

The driving force generated by the driving motor DM is, via a drive shaft (not illustrated) or the like, given to each of the wheels W.

When the driving motor DM receives, from the inverter INV, the regenerative current command value, the driving motor DM generates the regenerative braking force depending on the driving current command value.

The regenerative braking force generated by the driving motor DM is given to each of the wheels W via a drive shaft or the like.

Note that in the first embodiment, as one example, a configuration in which the driving motor DM generates the driving force or the regenerative braking force only to the right front wheel WFR and the left front wheel WFL, i.e., only to the front wheel WF is described.

Accordingly, the vehicle C of the first embodiment is a vehicle (EV: Electric Vehicle) in which the drive source that generates the driving force is an electric motor. Further, the vehicle C in the first embodiment is a vehicle (2WD vehicle) in which the drive system is a two-wheel drive. In the vehicle C of the first embodiment, the right front wheel WFR and the left front wheel WFL are driving wheels.

The transmission TR, based on the operation state of the shift lever (shift switch) by the driver, switches the travelling ranges (for example, "P: parking" range, "D: drive" range, "R: reverse" range and the like). Accordingly, the rotation direction and the rotation state of the wheels W are switched.

To the wheel W, from the driving motor DM, the driving force or the regenerative braking force is given.

Further, to the wheel W, the friction braking force is given via the wheel cylinder WS.

(Processes Conducted by Motor Control Unit 4 and Processes Conducted by Friction Braking Force Control Unit 6)

Figure 14A:
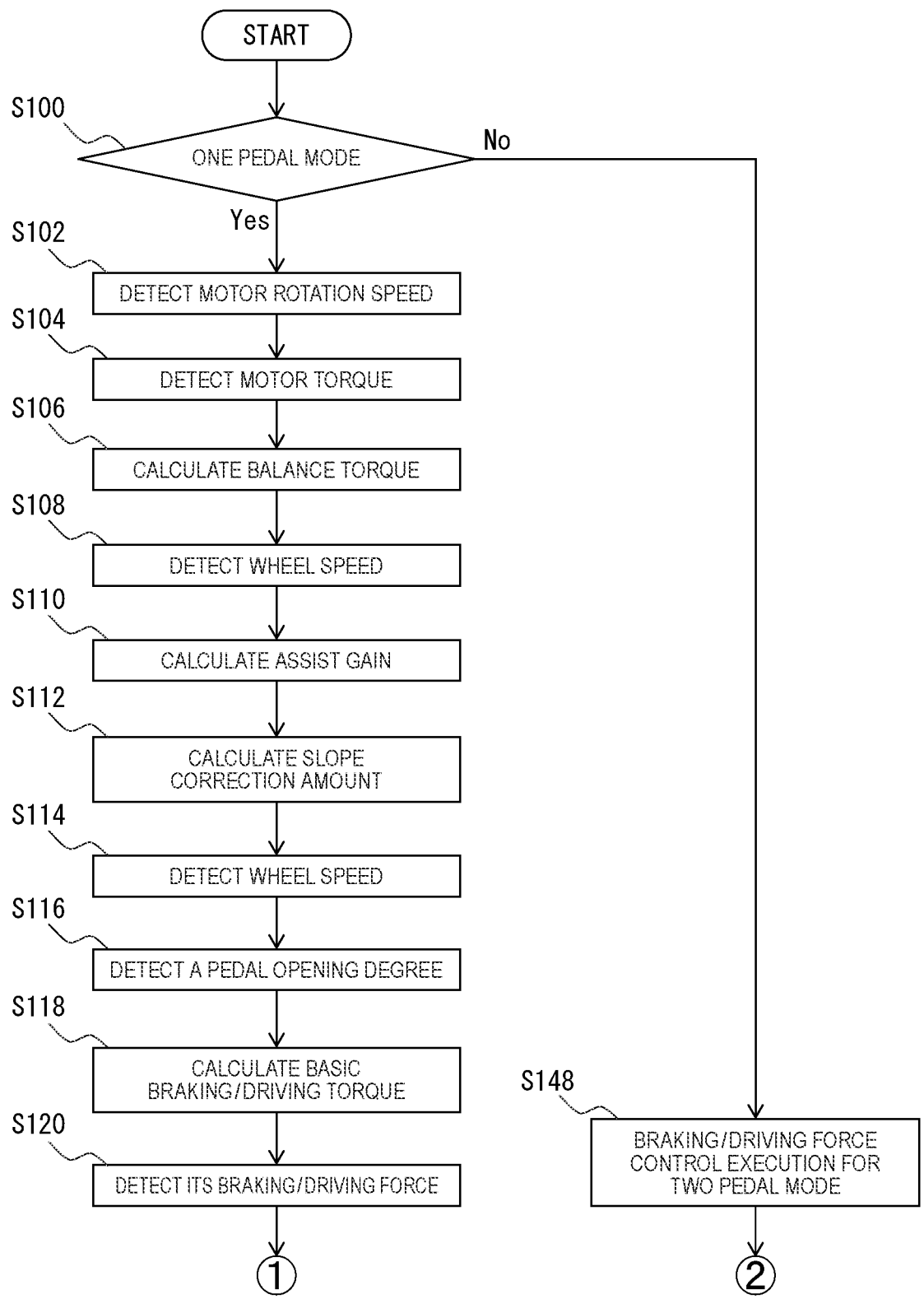
FIG. 14A is a flowchart illustrating processes conducted by the braking/driving force control device according to the first embodiment of the present invention.
Figure 14B:
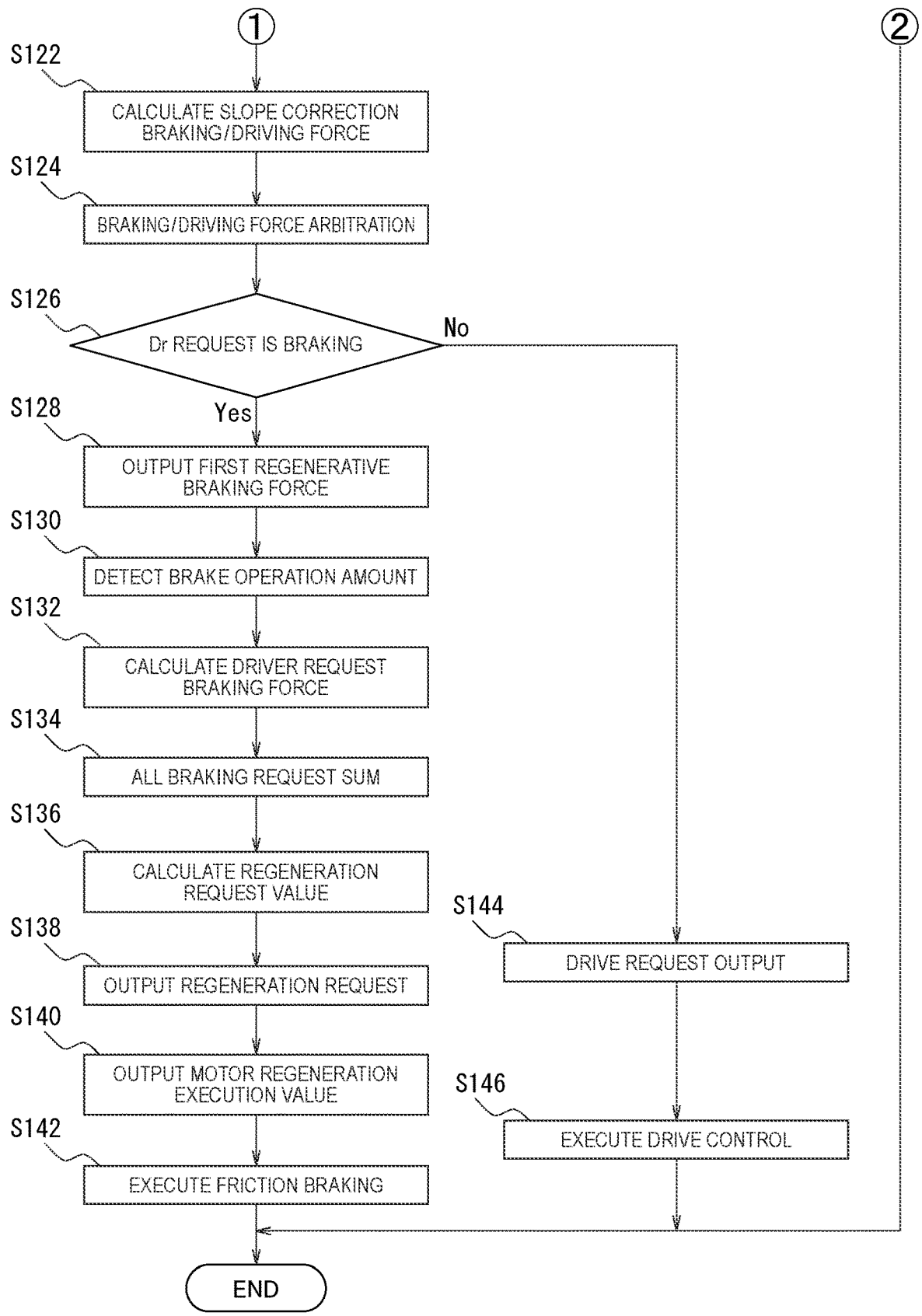
FIG. 14B is a flowchart illustrating processes conducted by the braking/driving force control device according to the first embodiment of the present invention.
Figure 15:
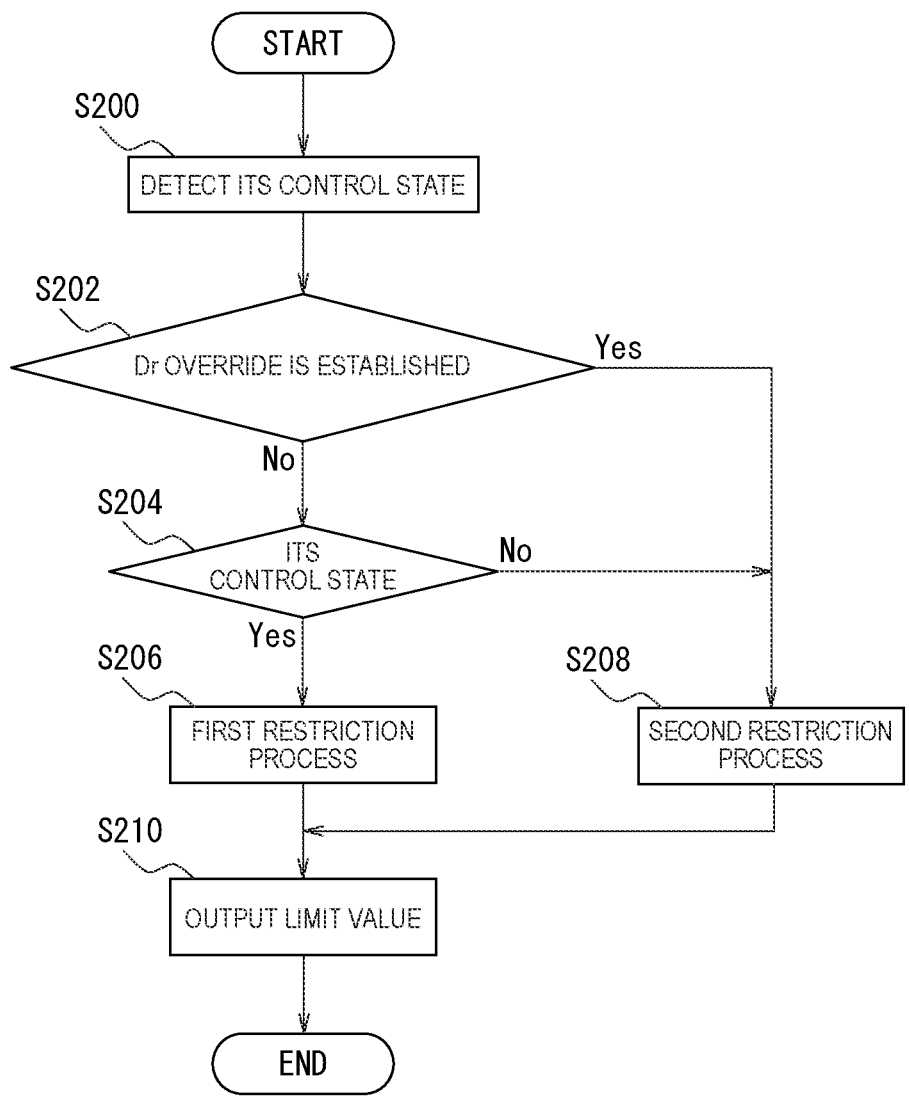
FIG. 15 is a flowchart illustrating processes conducted by the braking/driving force control device according to the first embodiment of the present invention.

With reference to FIG. 1 to FIG. 13, using FIG. 14A and FIG. 14B, and FIG. 15, one example of the process conducted by the motor control unit 4 and one example of the process conducted by the friction braking force control unit 6 are described. Note that in the following descriptions, the processes conducted by the motor control unit 4 and the friction braking force control unit 6 are referred to as "braking/driving force control process".

As illustrated in FIG. 14A and FIG. 14B, after the braking/driving force control process is started (START), the process of the step S100 is conducted.

At the step S100, the operation state of the mode selection switch 12 is detected. Accordingly, at the step S100, it is determined whether or not the "one pedal mode" is selected as the control mode of the vehicle C ("one pedal mode" in the drawing).

When at the step S100, it is determined that the "one pedal mode" is selected ("Yes" in the drawing) as the control mode of the vehicle C, the braking/driving force control process proceeds to the step S102.

On the other hand, when at the step S100, it is determined that the "two pedal mode" is selected ("No" in the drawing) as the control mode of the vehicle C, the braking/driving force control process proceeds to the step S148.

At the step S102, the motor rotation speed sensor MS detects the rotation speed of the motor driving force output shaft of the driving motor DM. Accordingly, at the step S102, the rotation speed of the driving motor DM is detected (the "detect motor rotation speed" in the drawing). After the rotation speed of the driving motor DM is detected at the step S102, the braking/driving force control process proceeds to the step S104.

At the step S104, the slope detection unit 42 detects the driving torque generated to the driving motor DM based on the driving current command value calculated by the driving force control unit 50 (the "detect motor torque" in the drawing). After the driving torque generated to the driving motor DM is detected at the step S104, the braking/driving force control process proceeds to the step S106.

At the step S106, the slope detection unit 42 determines the direction of the slope based on the rotation speed of the driving motor DM detected at the step S102 and the driving torque detected at the step S104 and detects the magnitude of the slope. At the step S106, the balance torque calculation unit 44a calculates the balance torque based on the direction of the slope determined by the slope detection unit 42 and the magnitude of the slope detected by the slope detection unit 42 (the "calculate balance torque" in the drawing). After the balance torque is calculated at the step S106, the braking/driving force control process to proceeds the step S108.

At the step S108, each of the wheel speed sensors 16 detects the rotation state of the corresponding wheel W as the wheel speed pulse. Accordingly, at the step S108, the revolution speed of each of the wheels W is detected (the "detect wheel speed" in the drawing). After the revolution speed of each of the wheels W is detected at the step S108, the braking/driving force control process proceeds to the step S110.

At the step S110, the assist gain calculation unit 44b calculates the assist gain using the vehicle speed detected at the step S108 (the "calculate assist gain" in the drawing). After the assist gain is calculated at the step S110, the braking/driving force control process proceeds to the step S112.

At the step S112, the slope correction unit 44c multiplies the balance torque calculated at the step S108 by the assist gain calculated at the step S110. Accordingly, at the step S112, a parameter for correcting the braking force or the driving force based on the direction and the magnitude of the slope is calculated (the "calculate slope correction amount" in the drawing). After the balance torque is multiplied by the assist gain at the step S112, the braking/driving force control process proceeds to the step S114.

At the step S114, as similar to the step S108, the revolution speed of each of the wheels W is detected (the "detect wheel speed" in the drawing). After the revolution speed of each of the wheels W is detected at the step S114, the braking/driving force control process proceeds to the step S116.

At the step S116, the accelerator sensor APS detects the operation amount of the accelerator pedal AP by the driver. Accordingly, at the step S116, the opening degree of the accelerator pedal AP is detected (the "detect A pedal opening degree" in the drawing). After the opening degree of the accelerator pedal AP is detected at the step S116, the braking/driving force control process proceeds to the step S118.

At the step S118, the basic braking/driving force calculation unit 40 calculates the target driving torque or the target braking torque based on the vehicle speed depending on the revolution speed detected at the step S114 and the opening degree of the accelerator pedal AP detected at the step S116. In other words, at the step S118, the driving torque or the braking torque depending on the braking/driving force map illustrated in FIG. 5 is calculated (the "calculate basic braking/driving torque" in the drawing). After the driving torque or the braking torque depending on the braking/driving force map is calculated at the step S118, the braking/driving force control process proceeds to the step S120.

At the step S120, the arbitration control unit 46 detects the braking force or the driving force selected by the ITS output setting unit 24 (the "detect ITS braking/driving force" in the drawing). After the driving force or the braking force selected by the ITS output setting unit 24 is detected at the step S120, braking/driving force control process proceeds to the step S122.

At the step S122, the slope correction unit 44*c* corrects the driving torque or the braking torque calculated at the step S118 using the parameter calculated at the step S112 (the parameter obtained by multiplying the balance torque by the assist gain). In other words, at the step S122, the slope correction unit 44*c* calculates the corrected braking force or the corrected driving force (the "calculate slope correction braking/driving force" in the drawing). After the corrected braking force or the corrected driving force is calculated at the step S122, the braking/driving force control process proceeds to the step S124.

Note that details of the process conducted at the step S122 are described later.

At the step S124, the arbitration control unit 46 compares the ITS output signal with the corrected driving force signal and selects a larger driving force or the braking force (select-high) (the "braking/driving force arbitration" in the drawing). When a larger value is selected out of the driving force or the braking force included in the ITS output signal and the corrected driving force signal at the step S124, the braking/driving force control process proceeds to the step S126.

At the step S126, it is determined whether or not the arbitration control unit 46 selects the braking force at the step S124 (the "Dr request is braking" in the drawing).

At the step S126, when it is determined that the arbitration control unit 46 selects the braking force at the step S124 ("Yes" in the drawing), the braking/driving force control process proceeds to the step S128.

On the other hand, at the step S126, when it is determined that the arbitration control unit 46 selects the driving force at the step S124 ("No" in the drawing), the braking/driving force control process proceeds to the step S144.

At the step S128, the first request braking force calculation unit 52 calculates a first regenerative braking force depending on the operation amount of the accelerator pedal AP and the vehicle speed. At the step S128, the first braking request signal including the calculated first regenerative braking force is output to the friction braking force control unit 6 ("output first regenerative braking force" in the drawing). After, the first braking request signal is output at the step S128, the braking/driving force control process proceeds to the step S130.

Note that the first regenerative braking force calculated at the step S128 is calculated such that, for example, as illustrated in FIG. 6, when the vehicle speed is equal to or less than the first threshold vehicle speed, the vehicle speed and also the first regenerative braking force decrease, and when the vehicle speed becomes "0", the first regenerative braking force also becomes "0".

In other words, at the step S128, when the vehicle speed is equal to or less than the first threshold vehicle speed, the first regenerative braking force is calculated so as to smoothly stop the vehicle C (smooth stop: SS).

At the step S130, the brake sensor BPS detects the operation amount of the brake pedal BP by the driver. Accordingly, at the step S130, the operation amount of the brake pedal BP is detected ("detect brake operation amount" in the drawing). After the operation amount of the brake pedal BP is detected at the step S130, the braking/driving force control process proceeds to the step S132.

At the step S132, the second request braking force calculation unit 60 calculates the second braking request that is the request of the braking force depending on the operation amount of the brake pedal BP by the driver and the vehicle speed ("calculate driver request braking force" in the drawing). After the second braking request is calculated at the step S132, the braking/driving force control process proceeds to the step S134.

At the step S134, the request braking force summation unit 62 sums the first regenerative braking force calculated at the step S128 and the second braking request calculated at the step S132 ("all braking request sum" in the drawing). After the first regenerative braking force and the second braking request are summed at the step S134, the braking/driving force control process proceeds to the step S136.

At the step S136, the regenerative coordination control unit 64 compares the first regenerative braking force included in the first regenerative signal received from the request braking force summation unit 62 with the second regenerative braking force included in the second regenerative signal. Further, at the step S136, the regenerative coordination control unit 64 selects a larger regenerative braking force (select-high) and selects the selected regenerative braking force as the request value of the regenerative braking force. Accordingly, at the step S136, the regenerative coordination control unit 64 calculates the request value of the regenerative braking force ("calculate regeneration request value" in the drawing). After the request value of the regenerative braking force is calculated at the step S136, the braking/driving force control process proceeds to the step S138.

At the step S138, the regenerative coordination control unit 64 outputs the regeneration request value signal including the request value of the regenerative braking force to the regenerative braking force control unit 54 ("output regeneration request" in the drawing). After the regeneration request value signal is output to the regenerative braking force control unit 54 at the step S138, the braking/driving force control process proceeds to the step S140.

At the step S140, the regenerative braking force control unit 54 calculates the regenerative current command value. Further, the regenerative torque signal including the regenerative current command value is output to the inverter INV. Accordingly, at the step S140, the driving motor DM generates the regenerative braking force depending on the regenerative current command value ("output motor regeneration execution value" in the drawing).

In other words, at the step S140, the regenerative braking force control unit 54 causes the driving motor DM to generate a larger regenerative braking force out of the first regenerative braking force and the second regenerative braking force, when the operation amount of the accelerator pedal AP is less than the threshold value and the brake pedal BP is operated.

After, the regenerative braking force depending on the regenerative current command value is generated at the step S140, the braking/driving force control process proceeds to the step S142.

At the step S142, the friction braking force calculation unit 66 calculates the friction braking force command value and the braking hydraulic pressure control unit 68 outputs the friction braking force command value to the master cylinder 18. Accordingly, at the step S142, the friction braking force depending on the friction braking force command value is generated ("execute friction braking" in the drawing). After the friction braking force depending on the friction braking force command value is generated at the step S142, the braking/driving force control process are ended (END).

At the step S144, the braking/driving force distribution unit 48 outputs, to the driving force control unit 50, the driving force distribution signal ("drive request output" in the drawing). After, the driving force distribution signal is output to the driving force control unit 50 at the step S144, the braking/driving force control process proceeds to the step S146.

At the step S146, the driving force control unit 50 calculates the driving current command value and outputs the calculated driving torque signal to the inverter INV. Accordingly, at the step S146, the driving motor DM generates the driving force depending on the driving current command value ("execute drive control" in the drawing). After the driving force depending on the driving current command value is generated at the step S146, the braking/driving force control process is ended (END).

At the step S148, the braking force and the driving force of the vehicle C are controlled based on the "two pedal mode" ("braking/driving force control execution for two pedal mode" in the drawing). Note that since the control of the braking force and the driving force based on the "two pedal mode" is a known technology, the description thereof is omitted. After the braking force and the driving force of the vehicle C are controlled based on the "two pedal mode" at the step S148, the braking/driving force control process are ended (END).

Next, with reference to FIG. 15, details of the process conducted at the above described step S122 (hereinafter sometimes referred to as "braking/driving force correction process") are described.

As illustrated in FIG. 15, after the braking/driving force correction process is started (START), the process of the step S200 is conducted.

At the step S200, by referring to the ITS determination signal output from the ITS control state output unit 26, the control state by the ITS control unit 2 is detected ("detect ITS control state" in the drawing). In other words, at the step S200, it is detected whether or not the ITS control unit 2 controls the braking force and the driving force separately from the braking force request or the driving force request by the driver of the vehicle C. After, the control state by the ITS control unit 2 is detected at the step S200, the braking/driving force correction process proceeds to the step S202.

At the step S202, it is determined whether or not the driver override is established ("Dr override is establish" in the drawing).

When it is determined that the driver override is not established at the step S202 ("No" in the drawing), the braking/driving force correction process proceeds to the step S204.

On the other hand, when it is determined that the driver override is established at the step S202 ("Yes" in the drawing), the braking/driving force correction process proceeds to the step S208.

At the step S204, it is determined whether or not the control state detected at the step S200 is a state where the control by the ITS control unit 2 is made ("ITS control state" in the drawing).

At the step S204, when it is determined that the control state detected at the step S200 is a state where the control by the ITS control unit 2 is made ("Yes" in the drawing), the braking/driving force correction process proceeds to the step S206.

On the other hand, when it is determined that the control state detected at the step S200 is not a state where the control by the ITS control unit 2 is made at the step S204 ("No" in the drawing), the braking/driving force correction process proceeds to the step S208.

At the step S206, the correction limiting unit 56 restricts the corrected braking force or the corrected driving force using a value obtained by multiplying the slope correction limit value by the upper limiter value and the lower limiter value ("first restriction process" in the drawing). After the corrected braking force or the corrected driving force is restricted using a value obtained by multiplying the slope correction limit value by the upper limiter value and the lower limiter value at the step S206, the braking/driving force correction process proceeds to the step S210.

At the step S208, the correction limiting unit 56 restricts the corrected braking force or the corrected driving force using the upper limiter value and the lower limiter value ("second restriction process" in the drawing). After the corrected braking force or the corrected driving force is restricted using the upper limiter value and the lower limiter value at the step S208, the braking/driving force correction process proceeds to the step S210.

At the step S210, the correction limiting unit 56 outputs an information signal including the limited braking force or the limited driving force to the arbitration control unit 46. In other words, at the step S210, a value obtained by limiting the corrected braking force or the corrected driving force is output to the arbitration control unit 46 ("limit value output" in the drawing). After a value obtained by limiting the corrected braking force or the corrected driving force is output to the arbitration control unit 46 at the step S210, the braking/driving force correction process is ended (END).

As described above, in the braking/driving force correction process, the correction amount for correcting the basic braking force and the basic driving force depending on the direction of the road surface slope and the magnitude of the slope is set to be smaller when the automatic travelling control is conducted compared to when the automatic travelling control is not conducted.

(Operations)

With reference to FIG. 1 to FIG. 15, using FIGS. 16A and 16B, one example of operations conducted using the braking/driving force control device 1 according to the first embodiment is described. Note that FIG. 16A illustrates a time chart of the operations conducted with a configuration applied with the braking/driving force control device 1 according to the first embodiment. FIG. 16B illustrates a time chart of the operations conducted with a configuration not applied with the braking/driving force control device 1 according to the first embodiment.

FIGS. 16A and 16B illustrate that the travelling state of the vehicle C transitions from a state where the vehicle C travels on the flat road surface (flat road) to a state where the vehicle C travels on the road surface having the upward slope (uphill). FIGS. 16A and 16B illustrate that the control (constant speed traveling control) by the ITS control unit 2 is made such that the vehicle C travels at the set speed.

When the time charts illustrated in FIGS. 16A and 16B are started, in a state where the driver does not operate the accelerator pedal AP, the driving force for travelling the vehicle C on the flat road at the set speed is generated to the vehicle C.

As to the driving force generated to the vehicle C, the driving force depending on the operation amount of the accelerator pedal AP by the driver is compared with the driving force calculated by the constant speed driving force calculation unit 20. Then, a larger driving force is selected (select-high) to set the driving force generated to the vehicle C.

Note that in FIGS. 16A and 16B, the braking/driving force depending on the operation amount of the accelerator pedal AP by the driver is represented as the "driver request braking/driving force". Similarly, in FIGS. 16A and 16B, the braking/driving force calculated by the ITS control unit 2 (in FIGS. 16A and 16B, only the driving force calculated by the constant speed driving force calculation unit 20) is represented as the "ITS braking/driving force". Further, in FIGS. 18A and 18B, the operation amount (opening degree) of the accelerator pedal AP is denoted with the reference numeral "APO".

Accordingly, as illustrated in FIGS. 16A and 16B, in a state where the driver does not operate the accelerator pedal AP, the driving force calculated by the constant speed driving force calculation unit 20 is set as the driving force generated to the vehicle C.

In a state where the driving force calculated by the constant speed driving force calculation unit 20 is generated to the vehicle C and the vehicle travels on the flat road, from the point of time "t1" when the driver starts operating the accelerator pedal AP, as the "APO" increases, the braking force depending on the "APO" decreases.

From the point of time "t2" when the driver maintains the "APO" at the constant value, when the vehicle C travels on the flat road, the braking/driving force depending on the "APO" is maintained at the constant value.

In a state where the "APO" is maintained at the constant value at the point of time "t2", when the travelling state of the vehicle C transitions from a state where the vehicle travels on the flat road to a state where the vehicle travels on the uphill, at point of time "t3" when the travelling state of the vehicle C is transitioned, the vehicle speed decreases.

At the point of time "t3", the slope correction unit 44c calculates the corrected driving force depending on the slope of the uphill. The calculated corrected driving force is added to the "driver request braking/driving force". Note that in FIGS. 16A and 16B, a braking/driving force obtained by adding the corrected driving force calculated by the slope correction unit 44c to the "driver request braking/driving force" is represented as the "slope correction braking/driving force".

In other words, at the point of time "t3", the braking/driving force depending on "APO" and the vehicle speed in the braking/driving force map illustrated in FIG. 5 is corrected based on the slope of the uphill. Therefore, from the point of time "t3", the "driver request braking/driving force" is the driving force that increases based on the slope of the uphill.

Note that FIGS. 16A and 16B illustrate a state where, until the point of time "t3", the operation amount of the accelerator pedal AP by the driver is equal to or less than the braking/driving force switching operation amount. In other words, the "driver request braking/driving force" is only the braking force from the start of the time charts illustrated in FIGS. 16A and 16B to the point of time "t3".

When at the point of time "t3", the vehicle speed decreases, the vehicle speed becomes less than the set speed. Thus, the constant speed driving force calculation unit 20 calculates the driving force that is increased according to the decrease in the vehicle speed. However, the calculation of the driving force by the constant speed driving force calculation unit 20 requires larger processes than that for the calculation of the corrected driving force by the slope correction unit 44c. This is because while the calculation by the slope correction unit 44c is made using the motor control unit 4 and the friction braking force control unit 6, the calculation by the constant speed driving force calculation unit 20 is made using the ITS control unit 2, the motor control unit 4, the friction braking force control unit 6, the vehicle speed calculation unit 14, and the wheel speed sensor 16.

Thus, as illustrated in FIGS. 16A and 16B, at the point of time "t3" when the travelling state of the vehicle C transitions, the calculation by the slope correction unit 44c is conducted. Then, the calculation by the constant speed driving force calculation unit 20 is conducted from the point of time "t4" after the lapse of a time necessary for reflecting the change in the vehicle speed by the vehicle speed calculation unit 14 from the point of time "t3".

Accordingly, as illustrated in FIGS. 16A and 16B, during a period from the point of time "t3" to the point of time "t4", the driving force represented by the "slope correction braking/driving force" exceeds the driving force represented with the "ITS braking/driving force". In other words, a value obtained by adding the corrected driving force calculated by the slope correction unit 44c to the "driver request braking/driving force" becomes larger than the driving force calculated by the constant speed driving force calculation unit 20.

In the braking/driving force control device 1 according to the first embodiment, it is determined whether or not the driver override is established and it is determined whether or not the ITS control unit 2 conducts the control. If the driver override is not established and the ITS control unit 2 conducts the control, the correction limiting unit 56 limits the corrected driving force using a value obtained by multiplying the slope correction limit value by the upper limiter value and the lower limiter value.

Accordingly, as illustrated in FIGS. 16A and 16B, the driving force represented by the "slope correction braking/driving force" is equal to or less than the driving force represented with the "ITS braking/driving force".

Alternatively, with a configuration not applied with the braking/driving force control device 1 according to the first embodiment, the driving force generated to the vehicle C is set by select-high between the "slope correction braking/driving force" and the "ITS braking/driving force" regardless of the determination result on the establishment of the driver override and the determination result on the control by the ITS control unit 2.

Accordingly, as illustrated in FIG. 16B, when the driving force represented by the "slope correction braking/driving force" exceeds the driving force represented with the "ITS braking/driving force", the driving force represented by the "slope correction braking/driving force" is generated to the vehicle C. By the driving force represented by the "slope correction braking/driving force" exceeding the driving force represented with the "ITS braking/driving force", even if the driver does not stop the operation of the accelerator pedal AP (does not take driver's foot off the accelerator), it is determined that the driver override is established.

Therefore, for example, when the travelling state of the vehicle C transitions from a state where the vehicle travels the uphill to a state where the vehicle travels on the flat road, the braking/driving force controlled by the ITS control unit 2 is not generated, and the braking/driving force generated to the vehicle C is the braking/driving force depending on the "APO". Accordingly, as illustrated in FIGS. 16A and 16B, in a state where the "driver request braking/driving force" is only the braking force, when the vehicle C that travels the uphill travels the flat road, the calculation of the corrected driving force by the slope correction unit 44c is stopped, and the deceleration is caused to the vehicle C. Accordingly, with a configuration not applied with the braking/driving force control device 1 according to the first embodiment, the deceleration not intended by the driver is caused to the vehicle C.

On the other hand, in the braking/driving force control device 1 according to the first embodiment, when the driver override is not established and the ITS control unit 2 conducts the control, as illustrated in FIG. 16A, the "slope correction braking/driving force" is equal to or less than the "ITS braking/driving force". If the driver continues the operation of the accelerator pedal AP, it is determined that the driver override is not established. Accordingly, at or after the point of time "t5" when the constant speed driving force calculation unit 20 calculates the driving force depending on the vehicle speed that decreases at the point of time "t3", the driving force represented with the "ITS braking/driving force" is maintained to the driving force depending on the set speed.

Thus, for example, when the travelling state of the vehicle C transitions from a state where the vehicle travels the uphill to a state where the vehicle travels the flat road, the braking/driving force controlled by the ITS control unit 2 is generated to the vehicle C. Accordingly, as illustrated in FIGS. 16A and 16B, in a state where the "driver request braking/driving force" is only the braking force, when the vehicle C that travels the uphill travels the flat road, the vehicle C travels with the driving force calculated by the ITS control unit 2. Accordingly, in the braking/driving force control device 1 according to the first embodiment, when a state where the operation amount of the accelerator pedal AP by the driver is equal to or less than the braking/driving force switching operation amount is continued, even if the road surface slope changes, it is possible to travel the vehicle C at the set speed.

Note that the above described wheel speed sensor 16 and the vehicle speed calculation unit 14 correspond to vehicle speed sensors that detect the travelling speed of the vehicle C.

The above described friction braking force control unit 6 and the regenerative braking force control unit 54 correspond to braking force control units.

Further, the above described friction braking force control unit 6, the regenerative braking force control unit 54, and the driving force control unit 50 correspond to braking/driving force control units.

As described above, in the braking/driving force control method using the braking/driving force control device 1 according to the first embodiment, the magnitude of the road surface slope along which the vehicle C travels is detected.

When the magnitude of the road surface slope increases (increase in upstream direction), the basic braking force is corrected to be decreased based on the magnitude of the slope, or the basic driving force is corrected to be increased based on the magnitude of the slope. Additionally, the corrected braking force or driving force is generated to the vehicle C.

On the other hand, when the magnitude of the road surface slope decreases (increase in downward direction), the basic braking force is corrected to be increased based on the magnitude of the slope, or the basic driving force is corrected to be decreased based on the magnitude of the slope. Additionally, the corrected braking force or driving force is generated to the vehicle C.

Note that the above described first embodiment is one example of the present invention, the present invention is not limited to the above described first embodiment, and even in a mode other than this embodiment, various modifications can be made depending on the design and the like within the scope not deviating from the technical idea of the present invention.

(Effects of First Embodiment)

The braking/driving force control method using the braking/driving force control device 1 according to the first embodiment can achieve the following effect.

(1) The magnitude of the road surface slope along which the vehicle C travels is detected.

When the magnitude of the road surface slope increases, the basic braking force is corrected to be decreased based on the magnitude of the slope, or the basic driving force is corrected to be increased based on the magnitude of the slope. On the other hand, when the magnitude of the road surface slope decreases, the basic braking force is corrected to be increased based on the magnitude of the slope, or the basic driving force is corrected to be decreased based on the magnitude of the slope. Additionally, the vehicle C is controlled such that the corrected braking force or driving force is generated to the vehicle C.

Thus, the basic braking force or the basic driving force is corrected based on whether the magnitude of the road surface slope increases or decreases. Additionally, it is possible to control the vehicle C such that the corrected braking force or driving force is generated to the vehicle C.

As a result, the acceleration/deceleration and the travelling speed of the vehicle C can be the acceleration/deceleration and the travelling speed depending on the operation amount of the accelerator pedal AP. Accordingly, during the travelling in which the operation amount of the accelerator pedal AP is constant, it is possible to suppress the change in the acceleration/deceleration and the vehicle speed depending on the change in the road surface slope.

Further, as the road surface slope is large in the upstream direction, the driving force can be increased (decrease braking force), and as the road surface slope is large in the downward direction, the driving force can be decreased (increase braking force). Accordingly, it is possible to suppress the deviation between the change in the acceleration/deceleration generated by the change in the road surface slope and the change in the acceleration/deceleration assumed by the driver.

Accordingly, during the travelling in which the driver operates the accelerator pedal AP at the operation amount equal to or greater than the threshold value, even if the road surface slope increases in the upstream direction, a state where the driving force is generated to the vehicle C can be maintained. Further, during the travelling in which the driver operates the accelerator pedal AP with the operation amount less than the threshold value, even if the road surface slope increases in the downward direction, a state where the braking force is generated to the vehicle C can be maintained.

Accordingly, it is possible to suppress the occurrence of a situation where the driver with the acceleration intension may increase the operation amount of the accelerator pedal AP due to the change in the road surface slope, that is operated with the operation amount equal to or greater than the threshold value.

Further, it is possible to suppress the occurrence of a situation where the driver with the deceleration intension may decrease the operation amount of the accelerator pedal AP due to the change in the road surface slope, that is operated with the operation amount less than the threshold value.

(2) The balance torque that is the braking torque or the driving torque capable of maintaining the stopped state of the vehicle C on the traveling road surface is calculated based on the direction of the road surface slope and the magnitude of the slope. The basic braking force and the basic driving force that are set by the braking/driving force map are continuously corrected to be increased or corrected to be decreased based on the calculated balance torque to set the corrected braking force or the corrected driving force.

In other words, the basic braking force and the basic driving force that are set by the braking/driving force map are continuously corrected to be increased or corrected to be decreased based on the balance torque to correct the basic driving force or the basic braking force.

Therefore, it is possible to set the corrected braking force or the corrected driving force by offsetting the braking/driving force map when the traveling road surface is the flat road based on the direction of the road surface slope and the magnitude of the slope in the direction along the opening degree change of the accelerator pedal AP.

As a result, in the process of offsetting the braking/driving force map set in advance in one direction, it is possible to correct the basic braking force and the basic driving force based on the direction of the road surface slope and the magnitude of the slope, and set the corrected braking force or the corrected driving force.

By continuously offsetting the braking/driving force map based on the direction of the road surface slope and the magnitude of the slope in a direction along the opening degree change of the accelerator pedal AP, it is possible to set the corrected braking force or the corrected driving force. Accordingly, by continuously correcting the basic braking force and the basic driving force relative to the change in the direction of the road surface slope and the magnitude of the slope, it is possible to set the corrected braking force or the corrected driving force.

(3) The braking/driving force map includes the change area in which as the travelling speed decreases (approach 0), the basic braking force decreases, and the degree of change of the basic braking force depending on the change in the travelling speed in the change area is equal to or less than the control limit gain. Additionally, the control limit gain is the upper limit of the degree of change such that the change in the travelling speed can follow the change in the basic braking force (regenerative braking force).

Thus, the degree of change of the basic braking force in the change area of the braking/driving force map is equal to or less than the control limit gain.

As a result, during the travelling in which the operation amount of the accelerator pedal AP is constant, even if the direction of the road surface slope changes, the change in the vehicle speed can always follow the change in the deceleration depending on the basic braking force and the basic driving force.

(4) The balance torque is multiplied by the assist gain that decreases from the maximum value as the travelling speed increases from the set vehicle speed. The basic braking force and the basic driving force calculated by the braking/driving force map are continuously corrected to be increased or corrected to be decreased based on a value obtained by multiplying the balance torque by the assist gain to set the corrected braking force or the corrected driving force.

Thus, as the travelling speed becomes close to the set vehicle speed (0 [km/h]), the braking force or the driving force that can maintain the stopped state of the vehicle C is generated. Additionally, in a state where the travelling speed increases from the set vehicle speed (0 [km/h]) and the vehicle C conducts the normal travelling, the correction amount for correcting the basic braking force and the basic driving force based on the direction of the road surface slope and the magnitude of the slope can be reduced.

As a result, in a state where the vehicle C conducts the normal travelling, a discomfort felt by a driver can be reduced.

(5) The degree of decrease of the assist gain that decreases as the travelling speed increases is equal to or less than the control limit gain.

Thus, the degree of decrease of the assist gain in the assist map is equal to or less than the control limit gain.

As a result, during the travelling in which the operation amount of the accelerator pedal AP is constant, even if the direction of the road surface slope changes, the change in the vehicle speed can always follow the change in the deceleration depending on the basic braking force and the basic driving force.

(6) The braking/driving force map is a map for generating the braking force for stopping the vehicle C when the operation amount of the accelerator pedal AP is equal to or less than the stop threshold operation amount ("0").

Thus, when the driver stops operating the accelerator pedal AP (driver takes off the foot from the accelerator pedal AP), until the vehicle C is stopped, the braking force for stopping the travelling vehicle C can be generated.

As a result, the vehicle C can be stopped with only the operation of the accelerator pedal AP without operating the brake pedal BP.

(7) Based on the corrected braking force (set corrected braking force), the first regenerative braking force is calculated. Further, the second regenerative braking force is calculated based on the operation amount of the brake pedal BP and the travelling speed of the vehicle C. When the operation amount of the accelerator pedal AP is less than the threshold value and the brake pedal BP is operated, a larger regenerative braking force out of the first regenerative braking force and the second regenerative braking force is generated by the driving motor DM.

Thus, even if the brake pedal BP is operated in a state where the regenerative braking force depending on the direction of the road surface slope and the magnitude of the slope is generated, only a larger regenerative braking force out of the first regenerative braking force and the second regenerative braking force is generated by the driving motor DM.

As a result, it is possible to generate a large regenerative braking force out of the first regenerative braking force and the second regenerative braking force in a situation where the brake pedal BP is operated in a state where the regenerative braking force depending on the operation amount of the accelerator pedal AP is generated. This prevents the simultaneous input of the two regenerative braking forces, suppresses the fluctuation in the regenerative braking force, and suppresses the fluctuation in the vehicle speed not intended by the driver while the vehicle is travelling.

Accordingly, since the hunting of the regenerative execution amount can be prevented and the driving motor DM can be properly controlled, the vehicle C can be smoothly stopped.

A larger regenerative braking force out of the first regenerative braking force and the second regenerative braking force is generated, and the friction braking force corresponding to a smaller regenerative braking force out of the first regenerative braking force and the second regenerative braking force is generated.

Accordingly, a braking force obtained by summing the first regenerative braking force and the second regenerative braking force can be generated with the regenerative braking force and the friction braking force, and the deceleration depending on the braking force obtained by summing the first regenerative braking force and the second regenerative braking force can be generated to the vehicle C.

It is possible to expand an application range of the control in a situation where the brake pedal BP is operated when the regenerative braking force depending on the operation amount of the accelerator pedal AP is generated and the vehicle is decelerating.

With reference to FIG. 1 to FIGS. 16A and 16B, using FIGS. 17, 18A, and 18B, effects achieved by the above described method are described below. In other words, an explanation will be made about the effect of generating a larger regenerative braking force out of the first and the second regenerative braking force to the driving motor DM when the operation amount of the accelerator pedal AP is less than the threshold value and the brake pedal BP is operated.

In a configuration in which the regenerative braking force depending on the operation amount of the accelerator pedal AP and the regenerative braking force depending on the operation amount of the brake pedal BP can be generated, using separate braking force maps (two braking force maps), the regenerative braking force to be generated is set depending on the requested deceleration and vehicle speed. This is because since the regenerative braking force depending on the operation amount of the accelerator pedal AP differs from the regenerative braking force depending on the operation amount of the brake pedal BP in a main use method, considering the suitability and the like, it is preferable to manage each of the regenerative braking forces based on a separate map.

However, when the brake pedal BP is operated during the SS control, as illustrated in FIG. 17, for example, the upper limits of the regenerative braking forces (regeneration limit line, regenerative coordination distribution line) are summed in the two braking force maps. Accordingly, as illustrated in FIG. 17, the regeneration request upper limit becomes large. Thus, in the change area in which the upper limit of the regenerative braking force changes depending on the change in the vehicle speed, the degree of change of the deceleration relative to the change in the vehicle speed rapidly increases compared with the separate braking force map (see FIG. 6, FIG. 12). Note that the "SS control" indicates a state in which in a situation where the brake pedal BP is not operated, the regenerative braking force that can smoothly stop the vehicle C is output.

Note that in FIG. 17, the region corresponding to the regenerative braking force is represented as the "regeneration", a line representing the upper limit of the regenerative braking force depending on the vehicle speed is represented as the "regeneration limit line", and a line representing the upper limit of the regenerative braking force depending on the operation amount of the brake pedal BP and the vehicle speed is represented as the "regenerative coordination distribution line". Further, the vehicle speed corresponding to the border line between the change area in which the upper limit of the regenerative braking force changes depending on the change in the vehicle speed and the fixed area in which the upper limit of the regenerative braking force is constant is represented as the "threshold vehicle speed", and a line obtained by continuing sums of the regeneration limit line and the regenerative coordination distribution line is represented as the "regeneration request total value".

In the change area, if the degree of change of the deceleration relative to the change in the vehicle speed is rapidly increased, while the vehicle C is decelerating, the change in the vehicle speed may not follow the rapid change of the deceleration depending on the regenerative braking force, and relative to the change in the deceleration depending on the regenerative braking force, the delay in the change in the vehicle speed is caused.

As illustrated in FIG. 18A, during a period after the vehicle speed is equal to or less than the threshold vehicle speed and the decrease in the regenerative execution amount is started until when the vehicle C is stopped, the change in the vehicle speed may not follow the regenerative execution amount that increases from the point of time when the deceleration is started and the hunting is caused to the regenerative execution amount. Note that in FIGS. 18A and 18B, the point of time when the deceleration is started is denoted with "t6", the point of time when the vehicle speed is equal to or less than the threshold vehicle speed, and the decrease in the regenerative execution amount is started is denoted with "t7", and the point of time when the vehicle C is stopped is denoted with "t8".

Alternatively, in the braking/driving force control method according to the first embodiment, when the brake pedal BP is operated during the SS control, a larger value is selected out of the request values calculated by assuming that the regeneration limit line or the regenerative coordination distribution line is the upper limit. Thus, from the point of time t7 to the point of time t8 in FIG. 18B, the upper limit value of the regenerative braking force is not a value obtained by summing the regeneration limit line and the regenerative coordination distribution line, but a value corresponding to a line out of the regeneration limit line or the regenerative coordination distribution line, whose value depending on the vehicle speed is larger than that of the other line.

Thus, in the braking/driving force control method according to the first embodiment, when the brake pedal BP is operated during the SS control, the change in the vehicle speed follows the regenerative execution amount between the point of time t7 and the point of time t8, and thus as illustrated in FIG. 18B, the hunting is not caused to the regenerative execution amount. Even when the brake pedal BP is operated in a state where the regenerative braking force depending on the operation amount of the accelerator pedal AP is generated, the driving motor DM can be properly controlled, and thus, the vehicle C can be smoothly stopped.

(8) The correction amount for correcting the basic braking force and the basic driving force when conducting the automatic travelling control for travelling the vehicle C at the travelling speed set in advance is smaller than the correction amount when the automatic travelling control is not conducted.

Thus, even if the braking force and the driving force by the slope correction depending on road surface slope are added to the braking force request or the driving force request of the driver, the braking force and the driving force by the slope correction when the automatic travelling control is conducted are more limited than the braking force and the driving force by the slope correction when the automatic travelling control is not conducted.

As a result, when the vehicle C travels on the flat road and then travels the uphill, it is possible to prevent a value obtained by adding the braking/driving force request of the driver to the driving force of the slope correction depending on the uphill from exceeding the driving force used for the automatic travelling control. Accordingly, it is possible to prevent the establishment of the driver override not intended by the driver and it can be determined whether or not the driver override intended by the driver is established.

The braking/driving force control device 1 according to the first embodiment can achieve the following effects.

(9) The device includes the slope detection unit 42 that detects the magnitude of the road surface slope along which the vehicle C travels. Further, the device includes the braking/driving force correction unit 44 that corrects the basic braking force or the basic driving force based on the magnitude of the slope detected by the slope detection unit 42. Additionally, the device includes the braking force control unit (friction braking force control unit 6, regenerative braking force control unit 54) that controls the braking force generated to the vehicle C based on the corrected braking force, and the driving force control unit 50 that controls the driving force generated to the vehicle C based on the corrected driving force.

When the magnitude of the road surface slope increases, the braking/driving force correction unit 44 corrects the basic braking force to be decreased based on the magnitude of the slope, or corrects the basic driving force to be increased based on the magnitude of the road surface slope. On the other hand, when the magnitude of the road surface slope decreases, the braking/driving force correction unit 44 corrects the basic braking force to be increased based on the magnitude of the road surface slope, or corrects the basic driving force to be decreased based on the magnitude of the road surface slope.

Accordingly, the basic braking force or the basic driving force is corrected based on whether the magnitude of the road surface slope increases or decreases. Additionally, the vehicle C can be controlled such that the corrected braking force or driving force is generated.

As a result, the acceleration/deceleration and the travelling speed of the vehicle C can be the acceleration/deceleration and the travelling speed depending on the operation amount of the accelerator pedal AP. Accordingly, during the travelling in which the operation amount of the accelerator pedal AP is constant, the change in the acceleration/deceleration and the vehicle speed depending on the change in the road surface slope can be suppressed.

As the road surface slope is larger in the upstream direction, the driving force can be increased (decrease braking force), and as the road surface slope is larger in the downward direction, the driving force can be decreased (increase braking force). Thus, it is possible to suppress the deviation between the change in the acceleration/deceleration generated by the change in the road surface slope and the change in the acceleration/deceleration assumed by the driver.

Accordingly, when the driver operates the accelerator pedal AP at the operation amount equal to or greater than the threshold value and the vehicle travels, even if the road surface slope increases in the upstream direction, a state where the driving force is generated to the vehicle C can be maintained. Further, when the driver operates the accelerator pedal AP at the operation amount less than the threshold value and the vehicle travels, even if the road surface slope increases in the downward direction, a state where the braking force is generated to the vehicle C can be maintained.

Accordingly, it is possible to prevent the occurrence of a situation where the driver with the acceleration intension may increase the operation amount of the accelerator pedal AP due to the change in the road surface slope, that is operated with the operation amount equal to or greater than the threshold value.

Further, it is possible to prevent the occurrence of a situation where the driver with the deceleration intension may decrease the operation amount of the accelerator pedal AP due to the change in the road surface slope, that is operated with the operation amount less than the threshold value.

(Variation of First Embodiment)

(1) Although in the first embodiment, the basic braking force and the basic driving force calculated by the braking/driving force map are continuously corrected to be increased or corrected to be decreased based on a value obtained by multiplying the balance torque by the assist gain, the method is not limited thereto.

Figure 19:
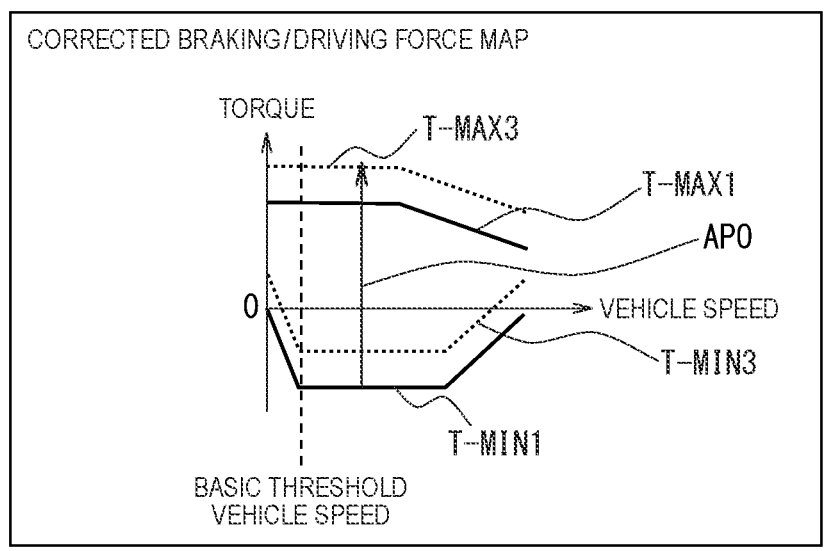
FIG. 19 is a drawing illustrating a variation of the first embodiment of the present invention.

In other words, as illustrated in FIG. 19, for example, the basic braking force and the basic driving force calculated by the braking/driving force map can be continuously corrected to be increased or corrected to be decreased based only on the balance torque.

Figure 20:
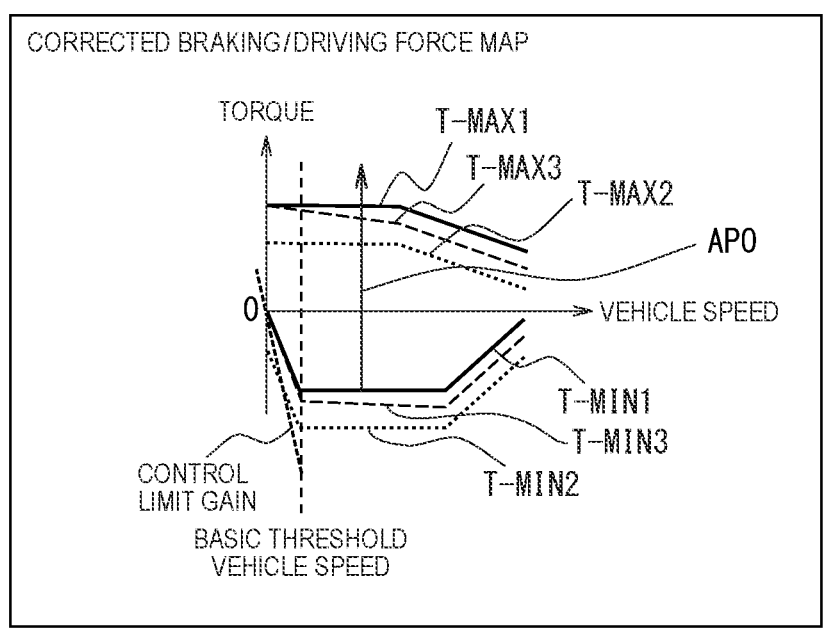
FIG. 20 is a drawing illustrating a variation of the first embodiment of the present invention.

(2) In the first embodiment, only the corrected braking/driving force map (see FIG. 9) used when the vehicle C travels on the road surface having the upward slope is represented. However, the corrected braking/driving force map is not limited thereto, and FIG. 20 illustrates, for example, the corrected braking/driving force map used when the vehicle C travels the road surface having the descending slope.

(3) In the first embodiment, as illustrated in FIG. 10, a case where the limiting value setting unit 56*a* sets the constant slope correction limit value is described regardless of the operation amount of the accelerator pedal AP, but the setting is not limited thereto.

Figure 21:
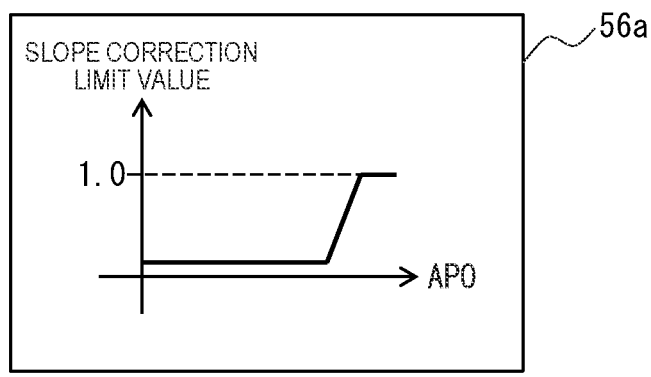
FIG. 21 is a drawing illustrating a variation of the first embodiment of the present invention.

In other words, as illustrated in FIG. 21, for example, when the operation amount of the accelerator pedal AP is equal to or larger than the operation amount at which the driver override is clearly established, as the operation amount of the accelerator pedal AP increases, the slope correction limit value can be increased. In this case, when the driver override is established, it is possible to suppress the sudden change of the braking force, and conduct the smooth process. Similarly, when the driver override is established, it is possible to suppress the sudden change of the driving force, and conduct the smooth process.

Figure 22:
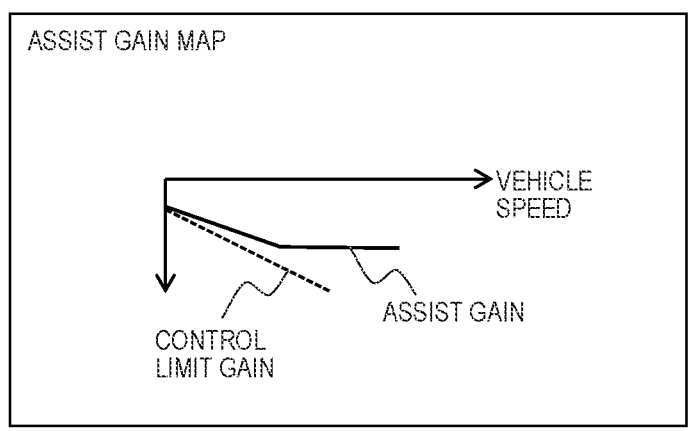
FIG. 22 is a drawing illustrating a variation of the first embodiment of the present invention.

(4) In the first embodiment, only the assist gain map indicating a relationship between the vehicle speed and the assist gain (see FIG. 8) when the vehicle C travels on the road surface having the upward slope is represented. However, the assist gain map is not limited thereto, and FIG. 22 illustrates, for example, the assist gain map used when the vehicle C travels the road surface having the descending slope.

(5) Although in the first embodiment, the basic braking force and the basic driving force calculated by the braking/driving force map are corrected based on a value obtained by multiplying the balance torque by the assist gain, the correction is not limited thereto.

The basic braking force and the basic driving force calculated by the braking/driving force map may be corrected using the following procedures.

Figure 23:
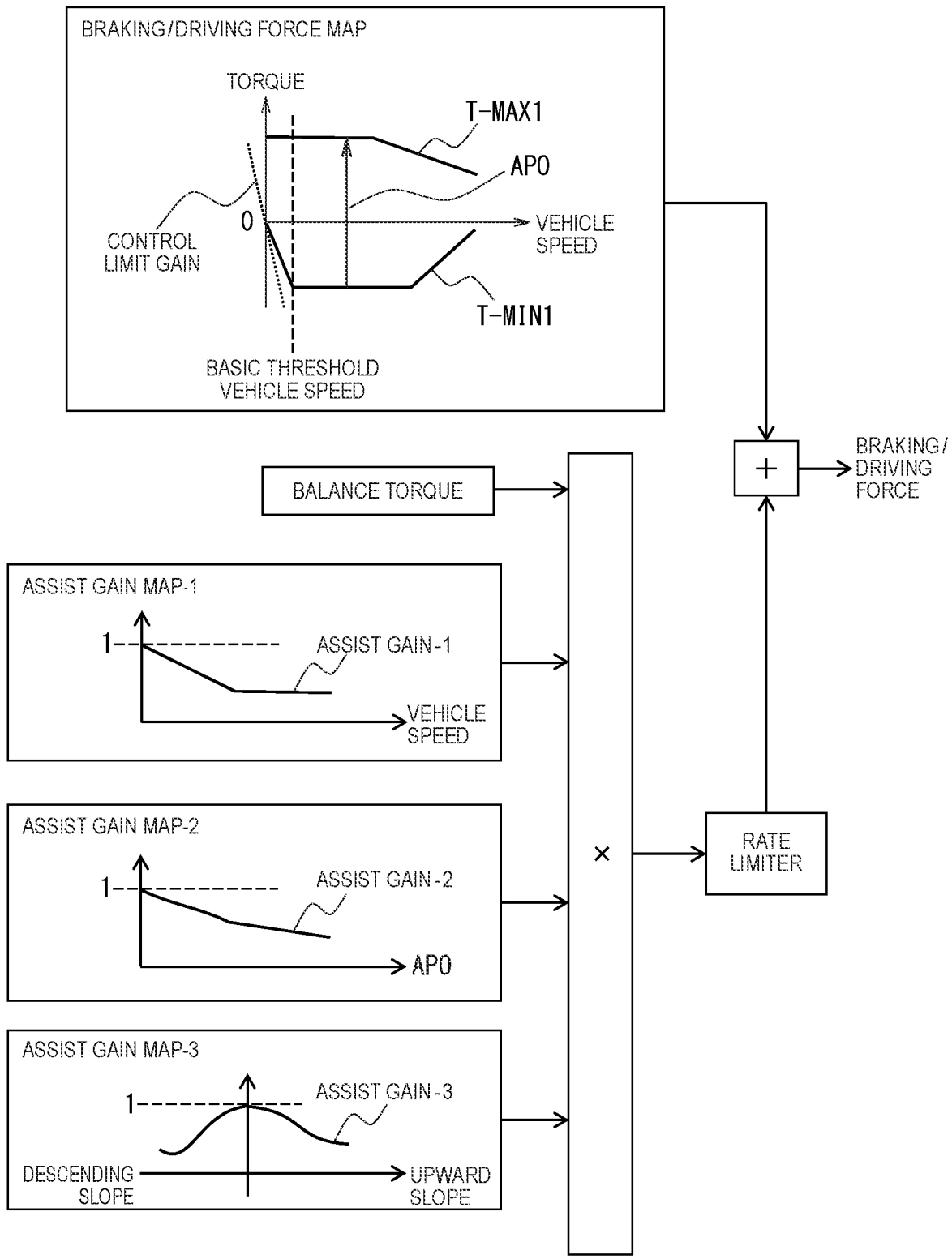
FIG. 23 is a drawing illustrating a variation of the first embodiment of the present invention.

First, as illustrated in FIG. 23, for example, in addition to the balance torque, three types of assist gains are calculated, and the balance torque is multiplied by the three types of assist gains. Using a value obtained by applying the process of suppressing the sudden change (rate limiter) on a value obtained by multiplying the balance torque by the three types of assist gains, the basic braking force and the basic driving force calculated at the braking/driving force map can be corrected.

Note that in FIG. 23, the three types of assist gains are represented as the "assist gain-1", the "assist gain-2", and the "assist gain-3".

The "assist gain-1" is similar to the "assist gain" of the first embodiment and is calculated using the "assist gain map-1" that is a map similar to the "assist gain map" of the first embodiment.

The "assist gain-2" is calculated based on the operation amount of the accelerator pedal AP. Specifically, to the "assist gain map-2" illustrated in FIG. 23, the operation amount of the accelerator pedal AP is input for the calculation. Note that the "assist gain map-2" illustrated in FIG. 23 indicates a relationship between the operation amount of the accelerator pedal AP and the "assist gain-2" when the vehicle C travels on the road surface having the upward slope. Further, in the "assist gain map-2" illustrated in FIG. 23, the operation amount (opening degree) of the accelerator pedal AP is denoted with the reference numeral "APO".

As indicated in the "assist gain map-2" the "assist gain-2" used for the vehicle C that travels the road surface having the upward slope takes the maximum value of "1" when the operation amount of the accelerator pedal AP is "0" i.e., in an accelerator off state.

Further vertical directions of the "assist gain-2" used for the vehicle C that travels the road surface having the descending slope and the "assist gain-2" used for the vehicle C that travels the road surface having the upward slope are reversed in the "assist gain map-2". Accordingly, shapes of the "assist gain map-2" differ between when the vehicle travels the road surface having the upward slope and when the vehicle travels the road surface having the descending slope. Accordingly, when the vehicle travels the road surface having the upward slope, in the accelerator off state, the "assist gain-2" becomes the maximum value of "1". On the other hand, when the vehicle travels the road surface having the descending slope, in the accelerator off state, the "assist gain-2" becomes the minimum value.

The "assist gain-3" is calculated based on the direction of the road surface slope and the magnitude of the slope. Specifically, to the "assist gain map-3" illustrated in FIG. 23, the direction of the road surface slope and the magnitude of the slope are input for the calculation.

As indicated in the "assist gain map-3" in a region where the road surface slope is gentle (gentle slope road surface), the "assist gain-3" approximates to the maximum value of "1". Alternatively, in the region where the road surface slope is steep (steep slope road surface), as the magnitude of the slope increases, the "assist gain-3" decreases.

Especially, on the traveling road surface having the slope that does not maintain the stopped state of the vehicle C, by setting the "assist gain-3" to be less than the maximum value ("1"), the control for not stopping the travelling vehicle C can be conducted.

(6) In the first embodiment, the correction amount for correcting the basic braking force and the basic driving force depending on the direction of the road surface slope and the magnitude of the slope when conducting the automatic travelling control is smaller than the correction amount when the automatic travelling control is not conducted, but the correction is not limited thereto.

In other words, when the automatic travelling control is conducted, the process of correcting the basic braking force and the basic driving force can be stopped. In other words, when the automatic travelling control is conducted, the calculation of the corrected braking force and the corrected driving force may be stopped and any one of the driving force calculated by the constant speed driving force calculation unit 20, the braking force calculated by the ITS braking/driving force calculation unit 22, and the driving force calculated by the ITS braking/driving force calculation unit 22 may be generated to the vehicle C.

In this case, when the automatic travelling control is conducted, it is possible to prevent the addition the driving force of the slope correction depending on the uphill to the braking/driving force request of the driver. Accordingly, the establishment of the driver override not intended by the driver can be prevented and is can be determined whether or not the driver override intended by the driver is established.

(7) Although in the first embodiment, the braking/driving force map is used to calculate the basic braking force and the basic driving force, the method is not limited thereto. In other words, for example, an equation set in advance may be used to calculate the basic braking force and the basic driving force.

Among the basic braking forces, an equation for calculating the regenerative braking force is formed from, for example, a relationship among the operation amount of the accelerator pedal AP, the operation amount of the brake pedal BP, the regeneration limit line, the regenerative coordination distribution line and the like. Further, among the basic braking forces, an equation for calculating the friction braking force is formed from, for example, a relationship among the operation amount of the accelerator pedal AP, the operation amount of the brake pedal BP, performances of the master cylinder 18 and the wheel cylinder WS, a car weight of the vehicle C and the like. An equation for calculating the basic driving force is formed from, for example, a relationship among the operation amount of the accelerator pedal AP, the vehicle speed, the performance of the driving motor DM, a car weight of the vehicle C and the like.

(8) In the first embodiment, as the drive source that gives the driving force to the wheel W, the driving motor DM is used, but the source is not limited thereto, and as the drive source, the engine may be used.

(9) In the first embodiment, the balance torque is calculated based on the direction and the magnitude of the slope included in the road surface slope signal, the method is not limited thereto. That is, the balance torque may be calculated by using an acceleration sensor (G sensor), for example.

(10) In the first embodiment, the braking/driving force map when the traveling road surface is the flat road is offset based on the direction and the magnitude of the road surface slope in the direction along the opening degree change of the accelerator pedal AP to set the corrected braking force or the corrected driving force, the method is not limited thereto.

That is, plural the braking/driving force maps depending on the direction and the magnitude of the road surface slope are stored in advance, for example, one of the plural the braking/driving force maps can be selected depending on a detected direction and magnitude of the road surface slope to set the corrected braking force or the corrected driving force.

REFERENCE SIGNS LIST

1 . . . braking/driving force control device
2 . . . ITS control unit
4 . . . motor control unit
6 . . . friction braking force control unit
8 . . . External environment recognition sensor
10 . . . Speed setting switch 12 . . . Mode selection switch
14 . . . Vehicle speed calculation unit
16 . . . Wheel speed sensor
18 . . . Master cylinder
20 . . . Constant speed driving force calculation unit
22 . . . ITS braking/driving force calculation unit
24 . . . ITS output setting unit
26 . . . ITS control state output unit
40 . . . Basic braking/driving force calculation unit
42 . . . Slope detection unit
44 . . . Braking/driving force correction unit
44a . . . Balance torque calculation unit
44b . . . Assist gain calculation unit
44c . . . Slope correction unit
46 . . . Arbitration control unit
48 . . . Braking/driving force distribution unit
50 . . . Driving force control unit
52 . . . First request braking force calculation unit
54 . . . Regenerative braking force control unit
56 . . . Correction limiting unit
56a . . . Limiting value setting unit
56b . . . Upper limit value storage unit
56c . . . Lower limit value storage unit
56d . . . Limit value multiplication unit
56e . . . Upper limit value switching unit
56f . . . Upper limit value correction unit
56g . . . Restriction processing unit
60 . . . Second request braking force calculation unit
62 . . . Request braking force summation unit
64 . . . Regenerative coordination control unit
66 . . . Friction braking force calculation unit
68 . . . Braking hydraulic pressure control unit
AP . . . Accelerator pedal
APS . . . accelerator sensor
DM . . . Driving motor
MS . . . Motor rotation speed sensor
WS . . . Wheel cylinder
INV . . . Inverter
BAT . . . Battery
BP . . . Brake pedal
BPS . . . Brake sensor
C . . . Vehicle
TR . . . Transmission
W . . . Wheel (left front wheel WFL, right front wheel WFR, left rear wheel WRL, right rear wheel WRR)

The invention claimed is:

1. A braking/driving force control method for generating either one of a driving force and a braking force based on an operation amount of an accelerator pedal of a vehicle, the braking/driving force control method comprising:
    setting a target driving force and a target braking force based on the operation amount of the accelerator pedal;
    detecting a magnitude of a road surface slope along which the vehicle travels;
    calculating a balance torque based on a direction of the road surface slope and the magnitude of the road surface slope, the balance torque being a braking torque or a driving torque capable of maintaining a stopped state of the vehicle on a traveling road surface on which the vehicle travels;
    correcting the target driving force to be increased based on the magnitude of the road surface slope or correcting the target braking force to be decreased based on the magnitude of the road surface slope when the magnitude of the road surface slope increases;
    correcting the target driving force to be decreased based on the magnitude of the road surface slope or correcting the target braking force to be increased based on the magnitude of the road surface slope when the magnitude of the road surface slope decreases; and
    generating the corrected target driving force or the corrected braking force,
    wherein a correction amount for correcting the target braking force or the target driving force depending on the magnitude of the road surface slope when conducting an automatic travelling control for travelling the vehicle at a travelling speed set in advance is smaller than a correction amount for correcting the target braking force or the target driving force depending on the magnitude of the road surface slope when the automatic travelling control is not conducted, wherein the method further comprises:
    setting in advance, to a braking/driving force map, a relationship among the operation amount of the accelerator pedal, the travelling speed of the vehicle, and the target braking force and the target driving force when the road surface slope is within a preset slope range including zero;
    inputting the operation amount of the accelerator pedal and the travelling speed to the braking/driving force map to set the target braking force and the target driving force; and
    continuously correcting the target braking force and the target driving force set by the braking/driving force map to be increased or decreased based on the balance torque.

2. The braking/driving force control method according to claim 1, wherein:
    the braking/driving force map includes a change area in which as the travelling speed decreases, the braking force decreases;
    a degree of change of the braking force depending on a change in the travelling speed in the change area is equal to or less than a control limit gain that is a degree of change set in advance; and
    the control limit gain is an upper limit of the degree of change such that a change in the travelling speed can follow a change in the braking force.

3. The braking/driving force control method according to claim 2, comprising:
    calculating an assist gain that becomes a maximum value when the travelling speed is a set vehicle speed set in advance and decreases from the maximum value as the travelling speed increases from the set vehicle speed;
    setting a degree of decrease of the assist gain to be equal to or less than the control limit gain; and
    continuously correcting the target braking force and the target driving force set by the braking/driving force map to be increased or decreased based on the value obtained by multiplying the balance torque by the assist gain to correct the target driving force or the target braking force.

4. The braking/driving force control method according to claim 1, comprising:
    calculating an assist gain that becomes a maximum value when the travelling speed is a set vehicle speed set in advance and decreases from the maximum value as the travelling speed increases from the set vehicle speed; and
    continuously correcting the target braking force and the target driving force set by the braking/driving force map to be increased or decreased based on a value obtained by multiplying the balance torque by the assist gain to correct the target driving force or the target braking force.

5. The braking/driving force control method according to claim 1, wherein a braking force for stopping the vehicle is generated based on the braking/driving force map when a detected operation amount of the accelerator pedal is equal to or less than a stop threshold operation amount set in advance.

6. The braking/driving force control method according to claim 1, wherein a correction of the target braking force and the target driving force is stopped when conducting the automatic travelling control.

7. A braking/driving force control method for generating either one of a driving force and a braking force based on an operation amount of an accelerator pedal of a vehicle, the braking/driving force control method comprising:
   setting a target driving force and a target braking force based on the operation amount of the accelerator pedal;
   detecting a magnitude of a road surface slope along which the vehicle travels;
   correcting the target driving force to be increased based on the magnitude of the road surface slope or correcting the target braking force to be decreased based on the magnitude of the road surface slope when the magnitude of the road surface slope increases;
   correcting the target driving force to be decreased based on the magnitude of the road surface slope or correcting the target braking force to be increased based on the magnitude of the road surface slope when the magnitude of the road surface slope decreases;
   generating the corrected target driving force or the corrected braking force, wherein a correction amount for correcting the target braking force or the target driving force depending on the magnitude of the road surface slope when conducting an automatic travelling control for travelling the vehicle at a travelling speed set in advance is smaller than a correction amount for correcting the target braking force or the target driving force depending on the magnitude of the road surface slope when the automatic travelling control is not conducted;
   calculating a first regenerative braking force based on the corrected braking force;
   calculating a second regenerative braking force based on an operation amount of a brake pedal of the vehicle and the travelling speed of the vehicle; and
   generating a larger regenerative braking force out of the first regenerative braking force and the second regenerative braking force to a motor when the operation amount of the accelerator pedal is less than a threshold value set in advance and the brake pedal is operated.

8. The braking/driving force control method according to claim 7, comprising:
   setting in advance, to a braking/driving force map, a relationship among the operation amount of the accelerator pedal, the travelling speed of the vehicle, and the target braking force and the target driving force when the road surface slope is within a preset slope range including zero;
   inputting the operation amount of the accelerator pedal and the travelling speed to the braking/driving force map to set the target braking force and the target driving force;
   calculating a balance torque based on a direction of the road surface slope and the magnitude of the road surface slope, the balance torque being a braking torque or a driving torque capable of maintaining a stopped state of the vehicle on a traveling road surface on which the vehicle travels; and
   continuously correcting the target braking force and the target driving force set by the braking/driving force map to be increased or decreased based on the balance torque.

9. The braking/driving force control method according to claim 8, wherein:
   the braking/driving force map includes a change area in which as the travelling speed decreases, the braking force decreases;
   a degree of change of the braking force depending on a change in the travelling speed in the change area is equal to or less than a control limit gain that is a degree of change set in advance; and
   the control limit gain is an upper limit of the degree of change such that a change in the travelling speed can follow a change in the braking force.

10. The braking/driving force control method according to claim 9, comprising:
    calculating an assist gain that becomes a maximum value when the travelling speed is a set vehicle speed set in advance and decreases from the maximum value as the travelling speed increases from the set vehicle speed;
    setting a degree of decrease of the assist gain to be equal to or less than the control limit gain; and
    continuously correcting the target braking force and the target driving force set by the braking/driving force map to be increased or decreased based on the value obtained by multiplying the balance torque by the assist gain to correct the target driving force or the target braking force.

11. The braking/driving force control method according to claim 8, comprising:
    calculating an assist gain that becomes a maximum value when the travelling speed is a set vehicle speed set in advance and decreases from the maximum value as the travelling speed increases from the set vehicle speed; and
    continuously correcting the target braking force and the target driving force set by the braking/driving force map to be increased or decreased based on a value obtained by multiplying the balance torque by the assist gain to correct the target driving force or the target braking force.

12. The braking/driving force control method according to claim 8, wherein a braking force for stopping the vehicle is generated based on the braking/driving force map when a detected operation amount of the accelerator pedal is equal to or less than a stop threshold operation amount set in advance.

13. The braking/driving force control method according to claim 7, wherein a correction of the target braking force and the target driving force is stopped when conducting the automatic travelling control.

14. A braking/driving force control method for generating either one of a driving force and a braking force based on an operation amount of an accelerator pedal of a vehicle, the braking/driving force control method comprising:
    calculating the braking force or the driving force for a vehicle travel speed set in advance regardless of the operation amount of the accelerator pedal;
    setting a target driving force and a target braking force based on the operation amount of the accelerator pedal;
    detecting a magnitude of a road surface slope along which the vehicle travels;

correcting the target driving force to be increased based on the magnitude of the road surface slope or correcting the target braking force to be decreased based on the magnitude of the road surface slope when the magnitude of the road surface slope increases;

correcting the target driving force to be decreased based on the magnitude of the road surface slope or correcting the target braking force to be increased based on the magnitude of the road surface slope when the magnitude of the road surface slope decreases;

selecting a larger one of the calculated driving force and the corrected target driving force, or selecting a larger one of the calculated braking force and the corrected target braking force;

controlling the vehicle so as to generate the selected larger one of the calculated driving force, the calculated braking force, the corrected target driving force, or the corrected target braking force; and when the calculated braking force or the calculated driving force is selected to conduct automatic travelling control, the correction amount for correcting the target braking force or the target driving force is smaller than a correction amount for correcting the target braking force or the target driving force when the automatic travelling control is not conducted.

15. The braking/driving force control method according to claim 14, comprising:

setting in advance, to a braking/driving force map, a relationship among the operation amount of the accelerator pedal, the vehicle travel speed, and the target braking force and the target driving force when the road surface slope is within a preset slope range including zero;

inputting the operation amount of the accelerator pedal and the vehicle travel speed to the braking/driving force map to set the target braking force and the target driving force;

calculating a balance torque based on a direction of the road surface slope and the magnitude of the road surface slope, the balance torque being a braking torque or a driving torque capable of maintaining a stopped state of the vehicle on a traveling road surface on which the vehicle travels; and continuously correcting the target braking force and the target driving force set by the braking/driving force map to be increased or decreased based on the balance torque.

16. The braking/driving force control method according to claim 15, wherein:

the braking/driving force map includes a change area in which as the vehicle travel speed decreases, the braking force decreases;

a degree of change of the braking force depending on a change in the vehicle travel speed in the change area is equal to or less than a control limit gain that is a degree of change set in advance; and the control limit gain is an upper limit of the degree of change such that a change in the vehicle travel speed can follow a change in the braking force.

17. The braking/driving force control method according to claim 16, comprising:

calculating an assist gain that becomes a maximum value when the vehicle travel speed is a set vehicle speed set in advance and decreases from the maximum value as the vehicle travel speed increases from the set vehicle speed;

setting a degree of decrease of the assist gain to be equal to or less than the control limit gain; and continuously correcting the target braking force and the target driving force set by the braking/driving force map to be increased or decreased based on the value obtained by multiplying the balance torque by the assist gain to correct the target driving force or the target braking force.

18. The braking/driving force control method according to claim 15, comprising:

calculating an assist gain that becomes a maximum value when the vehicle travel speed is a set vehicle speed set in advance and decreases from the maximum value as the vehicle travel speed increases from the set vehicle speed; and continuously correcting the target braking force and the target driving force set by the braking/driving force map to be increased or decreased based on a value obtained by multiplying the balance torque by the assist gain to correct the target driving force or the target braking force.

19. The braking/driving force control method according to claim 15, wherein a braking force for stopping the vehicle is generated based on the braking/driving force map when a detected operation amount of the accelerator pedal is equal to or less than a stop threshold operation amount set in advance.

20. The braking/driving force control method according to claim 14, comprising:

calculating a first regenerative braking force based on the corrected braking force;

calculating a second regenerative braking force based on an operation amount of a brake pedal of the vehicle and the vehicle travel speed; and generating a larger regenerative braking force out of the first regenerative braking force and the second regenerative braking force to a motor when the operation amount of the accelerator pedal is less than a threshold value set in advance and the brake pedal is operated.

21. The braking/driving force control method according to claim 14, wherein a correction of the target braking force and the target driving force is stopped when conducting the automatic travelling control.

22. A braking/driving force control device configured to generate either one of a driving force and a braking force based on an operation amount of an accelerator pedal of a vehicle, the braking/driving force control device comprising a computer programmed to:

calculate the braking force or the driving force for a vehicle travel speed set in advance regardless of an operation amount of an accelerator pedal;

set a target driving force and a target braking force based on the operation amount of the accelerator pedal;

detect a magnitude of a road surface slope along which the vehicle travels;

correct the target driving force to be increased based on the magnitude of the road surface slope or correcting the target braking force to be decreased based on the magnitude of the road surface slope when the magnitude of the road surface slope increases;

correct the target driving force to be decreased based on the magnitude of the road surface slope or correcting the target braking force to be increased based on the magnitude of the road surface slope when the magnitude of the road surface slope decreases;

select a larger one of the calculated driving force and the corrected target driving force, or select a larger one of the calculated braking force and the corrected target braking force;

control the vehicle so as to generate the selected larger one of the calculated driving force, the calculated braking force, the corrected target driving force, or the corrected target braking force; and when the calculated braking force or the calculated driving force is selected to conduct automatic travelling control, the correction amount for correcting the target braking force or the target driving force is smaller than a correction amount for correcting the target braking force or the target driving force when the automatic travelling control is not conducted.

23. The braking/driving force control device according to claim 22, wherein the computer is further programmed to:

set in advance, to a braking/driving force map, a relationship among the operation amount of the accelerator pedal, the vehicle travel speed, and the target braking force and the target driving force when the road surface slope is within a preset slope range including zero;

input the operation amount of the accelerator pedal and the vehicle travel speed to the braking/driving force map to set the target braking force and the target driving force;

calculate a balance torque based on a direction of the road surface slope and the magnitude of the road surface slope, the balance torque being a braking torque or a driving torque capable of maintaining a stopped state of the vehicle on a traveling road surface on which the vehicle travels; and continuously correct the target braking force and the target driving force set by the braking/driving force map to be increased or decreased based on the balance torque.

24. The braking/driving force control device according to claim 23, wherein the computer is further programmed to:

calculate an assist gain that becomes a maximum value when the vehicle travel speed is a set vehicle speed set in advance and decreases from the maximum value as the vehicle travel speed increases from the set vehicle speed; and continuously correct the target braking force and the target driving force set by the braking/driving force map to be increased or decreased based on a value obtained by multiplying the balance torque by the assist gain to correct the target driving force or the target braking force.

25. The braking/driving force control device according to claim 24, wherein the computer is further programmed to:

calculate an assist gain that becomes a maximum value when the vehicle travel speed is a set vehicle speed set in advance and decreases from the maximum value as the vehicle travel speed increases from the set vehicle speed;

set a degree of decrease of the assist gain to be equal to or less than the control limit gain; and continuously correct the target braking force and the target driving force set by the braking/driving force map to be increased or decreased based on the value obtained by multiplying the balance torque by the assist gain to correct the target driving force or the target braking force.

26. The braking/driving force control device according to claim 23, wherein:

the braking/driving force map includes a change area in which as the vehicle travel speed decreases, the braking force decreases;

a degree of change of the braking force depending on a change in the vehicle travel speed in the change area is equal to or less than a control limit gain that is a degree of change set in advance; and the control limit gain is an upper limit of the degree of change such that a change in the vehicle travel speed can follow a change in the braking force.

27. The braking/driving force control device according to claim 23, wherein a braking force for stopping the vehicle is generated based on the braking/driving force map when a detected operation amount of the accelerator pedal is equal to or less than a stop threshold operation amount set in advance.

28. The braking/driving force control device according to claim 22, wherein the computer is further programmed to:

calculate a first regenerative braking force based on the corrected braking force;

calculate a second regenerative braking force based on an operation amount of a brake pedal of the vehicle and the vehicle travel speed; and generate a larger regenerative braking force out of the first regenerative braking force and the second regenerative braking force to a motor when the operation amount of the accelerator pedal is less than a threshold value set in advance and the brake pedal is operated.

29. The braking/driving force control device according to claim 22, wherein a correction of the target braking force and the target driving force is stopped when conducting the automatic travelling control.

* * * * *